US010783705B2

(12) United States Patent
Lacey et al.

(10) Patent No.: US 10,783,705 B2
(45) Date of Patent: *Sep. 22, 2020

(54) TESSELLATION METHOD USING RECURSIVE SUB-DIVISION OF TRIANGLES

(71) Applicant: Imagination Technologies Limited, Kings Langley (GB)

(72) Inventors: Peter Malcolm Lacey, Buckinghamshire (GB); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,544

(22) Filed: Sep. 6, 2018

(65) Prior Publication Data

US 2019/0005721 A1 Jan. 3, 2019

Related U.S. Application Data

(63) Continuation of application No. 15/173,844, filed on Jun. 6, 2016, now Pat. No. 10,096,155.

(30) Foreign Application Priority Data

Jun. 5, 2015 (GB) .................................. 1509763.7

(51) Int. Cl.
*G06T 17/20* (2006.01)
*G06T 15/00* (2011.01)

(52) U.S. Cl.
CPC ............ *G06T 17/20* (2013.01); *G06T 15/005* (2013.01); *G06T 17/205* (2013.01)

(58) Field of Classification Search
None
See application file for complete search history.

(56) References Cited

U.S. PATENT DOCUMENTS

| 6,940,505 B1 | 9/2005 | Savine et al. |
| 2004/0196285 A1* | 10/2004 | Rice ......................... G06T 17/20 345/423 |
| 2011/0057931 A1 | 3/2011 | Goel et al. |
| 2014/0152675 A1 | 6/2014 | Todd et al. |

(Continued)

FOREIGN PATENT DOCUMENTS

WO 2009/099703 A2 8/2009

*Primary Examiner* — Kyle Zhai
(74) *Attorney, Agent, or Firm* — Potomac Law Group, PLLC; Vincent M DeLuca

(57) ABSTRACT

A tessellation method uses tessellation factors defined for each vertex of a patch which may be a quad, a triangle or an isoline. The method is implemented in a computer graphics system and involves comparing the vertex tessellation factors to a threshold. If the vertex tessellation factors for either a left vertex or a right vertex, which define an edge of an initial patch, exceed the threshold, the edge is sub-divided by the addition of a new vertex which divides the edge into two parts and two new patches are formed. New vertex tessellation factors are calculated for each vertex in each of the newly formed patches, both of which include the newly added vertex. The method is then repeated for each of the newly formed patches until none of the vertex tessellation factors exceed the threshold.

20 Claims, 20 Drawing Sheets

(56) References Cited

U.S. PATENT DOCUMENTS

2014/0210819 A1* 7/2014 Mei .................. G06T 15/005
 345/423
2016/0104458 A1* 4/2016 Kim .................. G06T 15/005
 345/423

* cited by examiner (2, 1, 1, 1)

(4, 0, 0, 0)

(3, 3, 3, 3)

(2, 2, 0, 1)

(4.5, 2, 2, 4.5)

(2, 5, 0, 2)

(3, 3, 2.5, 2.5)

(5, 5, 5, 0)

(4, 5, 3, 3)

(5.5, 3.5, 3.5, 3.5)

(2, 2, 2)

(2, 5.5, 2)

(1.5, 4, 4)

(3, 0, 0)

(0, 4, 1.5)

(1.5, 6, 2.5)

(1, 1, 1, 1, 2)

(3, 3, 3, 3, 6)

(1, 5, 1, 5, 6)

(1, 1, 1, 2)

(5, 5, 5, 0)

(1, 5, 5, 6)

TESSELLATION METHOD USING RECURSIVE SUB-DIVISION OF TRIANGLES

BACKGROUND

Tessellation is a technique used in computer graphics to divide up a surface in a 3-D scene into a number of smaller and simpler pieces, (referred to as primitives), typically triangles, which are more amenable to rendering. For example, the surface may represent an object in the scene. The resulting tessellated surface is generally an approximation to the original surface, but the accuracy of this approximation can be improved by increasing the number of generated primitives, which in turn usually results in the primitives being smaller. The amount of tessellation/sub-division is usually determined by a specified level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface patches') and/or have displacement mapping applied. The sub-division, however, is not performed on curved patches but is instead performed in the domain of the patch (e.g. as if the patch is planar rather than being defined by, for example, a polynomial equation) which may be defined in terms of (u,v) parameters and referred to as 'parametric space'. This means that the tessellation process is independent of any curvature present in the final surface.

Tessellation may be performed ahead of time (e.g. to compute a number of different views of a scene at different levels of detail and/or from different viewpoints) or may be performed on the fly (e.g. to provide continuous or view-dependent levels of detail). With some existing tessellation methods, a user can experience undesirable visual artefacts where, although the requested level of detail is changed smoothly, the resulting tessellation changes in a discontinuous fashion.

The embodiments described below are provided by way of example only and are not limiting of implementations which solve any or all of the disadvantages of known methods and apparatus for performing tessellation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A tessellation method is described which uses tessellation factors defined for each vertex of a patch which may be a quad, a triangle or an isoline. The method is implemented in a computer graphics system and involves comparing the vertex tessellation factors to a threshold. If the vertex tessellation factors for either a left vertex or a right vertex, which define an edge of an initial patch, exceed the threshold, the edge is sub-divided by the addition of a new vertex which divides the edge into two parts and two new patches are formed. New vertex tessellation factors are calculated for each vertex in each of the newly formed patches, both of which include the newly added vertex. The method is then repeated for each of the newly formed patches until none of the vertex tessellation factors exceed the threshold.

A first aspect provides a method of performing tessellation in a computer graphics system, the method comprising: for an initial patch comprising a left vertex and a right vertex connected by an edge and defined in domain space: comparing a vertex tessellation factor of the left vertex and a vertex tessellation factor of the right vertex to a threshold value; in response to determining that neither of the vertex tessellation factors of the left and right vertices exceed the threshold value, outputting data describing the initial patch; and in response to determining that either of the vertex tessellation factors of the left and right vertices exceed the threshold value, forming a new vertex sub-dividing the edge into two parts, calculating a vertex tessellation factor for the new vertex, dividing the initial patch to form a first new patch comprising the left vertex and the new vertex and a second new patch comprising the right vertex and the new vertex and reducing the vertex tessellation factor of each vertex in each of the newly formed patches.

A second aspect provides a hardware tessellation unit comprising hardware logic configured, for an initial patch comprising a left vertex and a right vertex connected by an edge and defined in domain space, to: compare a vertex tessellation factor of the left vertex and a vertex tessellation factor of the right vertex to a threshold value; in response to determining that neither of the vertex tessellation factors of the left and right vertices exceed the threshold value, output data describing the initial patch; and in response to determining that either of the vertex tessellation factors of the left and right vertices exceed the threshold value, form a new vertex sub-dividing the edge into two parts, calculate a vertex tessellation factor for the new vertex, divide the initial patch to form a first new patch comprising the left vertex and the new vertex and a second new patch comprising the right vertex and the new vertex and reduce the vertex tessellation factor of each vertex in each of the newly formed patches.

Further aspects provide a non-transitory computer readable storage medium having stored thereon computer executable program code that when executed causes at least one processor to perform a method as set out above, a graphics processing unit comprising a hardware tessellation unit as set out above, a computer readable storage medium having encoded thereon computer readable program code defining the hardware tessellation unit as set out above and a computer readable storage medium having encoded thereon computer readable program code defining a hardware tessellation unit configured to perform the method as set out above.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
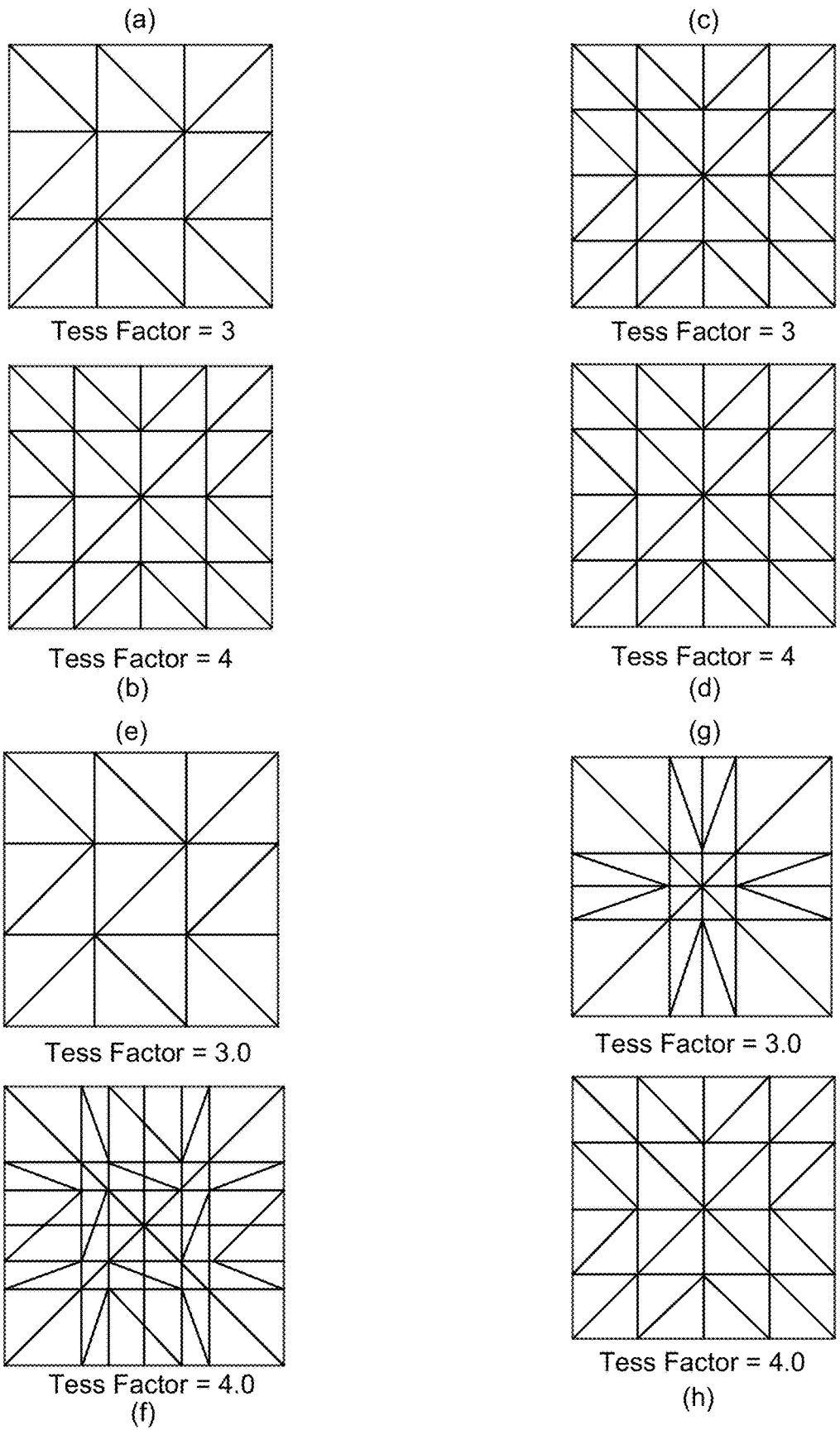
FIG. 1 shows the results of using various known tessellation methods.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

There are a number of known tessellation methods which use an edge tessellation factor (TF) which is defined for each edge of a patch (e.g. of a quad or triangle) and which determine how many times the edge (and hence the patch) should be sub-divided. FIG. 1 shows how the resulting triangles differ when using different edge tessellation factors, but the same tessellation factor for each edge.

The first four examples (a)-(d) in FIG. 1 show:
(a) Integer partitioning, edge TF=3 for all four edges
(b) Integer partitioning, edge TF=4 for all four edges
(c) Power of two integer partitioning, edge TF=3 for all four edges
(d) Power of two integer partitioning, edge TF=4 for all four edges With integer partitioning and power of two integer partitioning, the vertices along each edge are always evenly spaced; however, unwanted visual artefacts (as explained below) are very likely to occur where the sub-division level changes and the triangles are not tiny, but as small polygons incur additional rendering overhead, it is undesirable to make the polygons this small. The effect is particularly dramatic for power of two integer partitioning as the step size can be much larger.

The second four examples (e)-(h) in FIG. 1 show fractional partitioning methods which (unlike examples (a)-(d)) generate vertices at varying offsets:
e) Odd fractional partitioning, edge TF=3.0 for all four edges
f) Odd fractional partitioning, edge TF=4.0 for all four edges
g) Even fractional partitioning, edge TF=3.0 for all four edges
h) Even fractional partitioning, edge TF=4.0 for all four edges Other considerations when selecting a tessellation method are not only the numbers of triangles generated for given combinations of edge tessellation settings, since the rendering cost of the tessellated model is partially dependent on the number of triangles, but also the aspect ratio of those triangles. Typically graphics systems (either software or hardware) will render an 'equilateral' triangle of a given screen area (i.e. screen pixels), which implies a minimum perimeter to area ratio, more quickly than a (long thin) triangle which has the same area but a higher perimeter to area ratio. Furthermore, when values, such as the results of shading, are computed at vertices and then interpolated across triangles, having more equilaterally-shaped triangles should result in fewer artefacts.

A further consideration is the complexity of the algorithm used to generate the pattern of triangles. If the algorithm can be kept simple and or regular (e.g. without having many 'special cases' that need to be handled differently), this can reduce hardware or software implementation costs.

A final desirable consideration is rotational/reflective symmetry in the tessellation pattern. It would be preferable that, for example, a quad patch defined with vertices, given in, say, clockwise order, ABCD and with appropriate tessellation factors, produce the same final triangle mesh as the 'equivalent' quad with vertices listed as BCDA. Some existing tessellation schemes do not guarantee this property (e.g. see the middle square in the 'odd' tessellation methods in examples (e) and (f) of FIG. 1).

In this description, a surface patch refers to a usually finite, N-dimensional surface (or in the case of an isoline, an N-dimensional curve segment) which is the result of applying a parametric mapping function to a bounded 2D domain, which is either a quadrilateral or a triangle, (or in the case of an isoline, a 1D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space) in which any position in the domain can be described by two coordinates (u,v) known as the domain space coordinates, which means that the tessellation process is independent of any curvature present in the final surface.

An improved tessellation method is described herein and when describing this tessellation method the term 'patch' is used to refer to an ordered set of two, three or four vertices (for an isoline, triangle or quad respectively) which bound a domain. The term 'domain' therefore refers to the two-dimensional space bounded by the vertices of a patch. The term 'vertex' is used generally to describe a location plus other attributes, where these attributes differ depending upon the context. For example, input control points and output vertices from a domain shader comprise a 3D position plus other parameters such as the normal, tangent, texture, etc., whereas the vertices within the tessellator (i.e. those used within the tessellation method) comprise a domain space coordinate and a vertex tessellation factor. These vertices within the tessellator are therefore not the same as the input control points or the resulting N-dimensional vertices that form the final triangles.

An improved tessellation method is described herein which does not use edge tessellation factors but instead uses tessellation factors defined for each corner vertex of the quad or triangle or each end vertex of an isoline. These tessellation factors are referred to as 'vertex tessellation factors' to distinguish them from the edge tessellation factors used in the known methods described above. As described in detail below, tessellation (i.e. sub-division of a patch) occurs when any of the vertex tessellation factors for a patch exceed a defined threshold. When new vertices are added, these sub-divide the edge into two parts (where, in various examples, these two parts may equal such that the edge is bisected) and the method acts recursively upon triangle patches.

The improved tessellation method described herein addresses one or more (and in various examples, all) of the following problems which arise in known tessellation methods:

Snapping—the effect of large amounts of tessellation occurring instantaneously. This can cause not only temporal visual artefacts in an animation but also results in discontinuous rendering times. This is especially a problem for "Power of 2" methods (e.g. examples (c) and (d) in FIG. 1).

Cracking—the sub-division of edges on boundaries needs to be consistent to avoid T-junctions. After applying displacement mapping any T-junctions will almost certainly result in cracks appearing, where the viewer can see through the object.

Swimming—moving the position of a vertex in domain space as a function of its tessellation factor results in the geometry appearing to shimmer or "swim" as the amount of displacement changes.

Over/under tessellation—for example, a tessellation factor of 32 desires an edge to be sub-divided into 32 segments. Fewer than this may result in the mesh not being refined enough to model the scene. More than this may result in the mesh being too refined and using too much computation.

Thin triangles—rendering thin triangles can result in more aliasing artefacts as well as being computationally expensive as the rendering cost of a triangle is not only dependent upon its screen pixel area but also, to some extent, on the length of its perimeter in screen pixels. It is therefore usually more efficient to render a patch represented by N 'near equilateral' triangles than the same patch represented by N 'long thin' triangles especially when the thin triangles vanish as the LOD changes and are essentially redundant. Hence the method described below aims to maximise the minimum Root Area to Perimeter Ratio.

Space/time complexity—any tessellation method should ideally be simple and highly parallel and minimise Time and Space complexity (i.e. the time taken to perform the rendering and the amount of memory that is required to implement the algorithm). Also it must not add too many bits to the size of a vertex as this increases memory requirements. The space and time complexity also impacts the physical area of the hardware that is required to perform tessellation.

Figure 2:
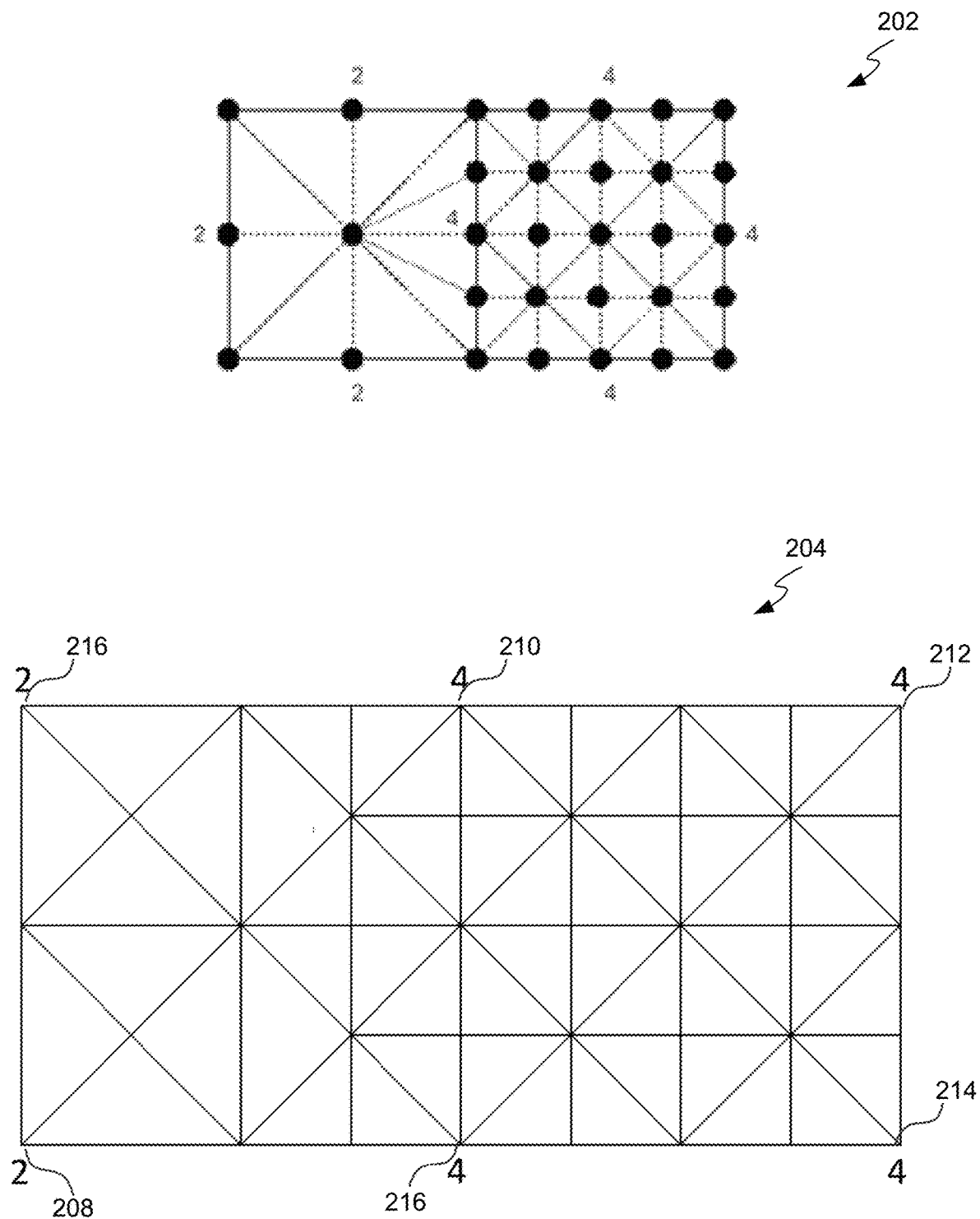
FIG. 2 shows examples of the different results obtained using a prior art method with edge tessellation factors and a method described herein which uses vertex tessellation factors.

Specifying the TF at the corners of the patch results in fewer abrupt changes in sizes and shapes of resulting triangles within the tessellated patch, because the partitioning of an edge is not fixed (i.e. to a value specified by the edge TF) but is instead determined by the vertex TFs at each end of the edge and varies smoothly not only along the original edge (in a 1D sense in domain space) to produce a gradual transition between levels of sub-division, but also, in combination with the other TFs, allows it to vary smoothly across the patch in a 2D sense. This is shown graphically in FIG. 2 which shows, in domain space, the difference between defining the tessellation factor at the edges (diagram 202) using a known method and defining tessellation factors at the corners (or vertices, diagram 204). The first diagram 202 is the result of using power of two defined tessellation factors across the edges in the case of two quads with edge tessellation factors of 2 and 4. The second diagram 204 uses the method described below and vertex tessellation factors of 2 (for vertices 206, 208) and 4 (for vertices 210-216).

Figure 3:
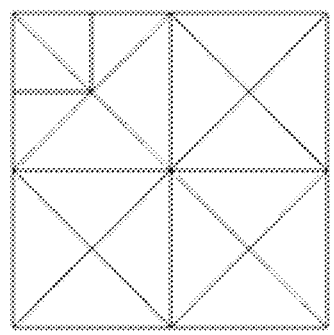
FIG. 3 shows various example results obtained using the improved tessellation method described herein.
Figure 3:
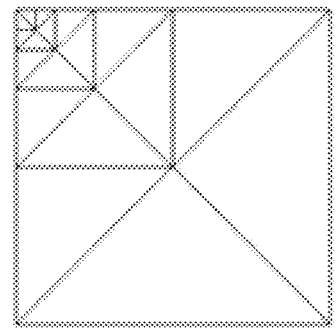
Figure 3:
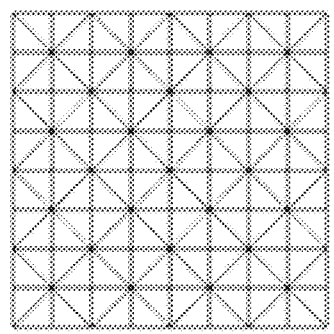
Figure 3:
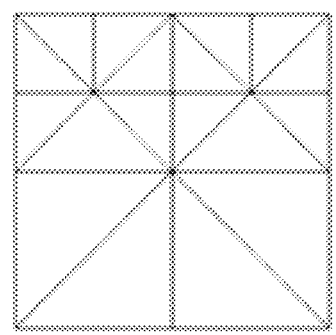
Figure 3:
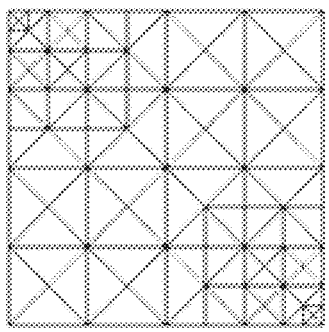
Figure 3:
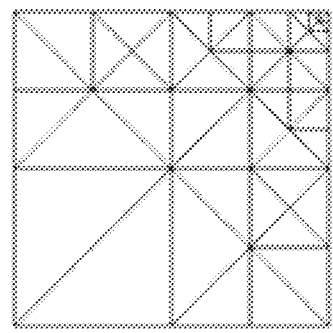
Figure 3:
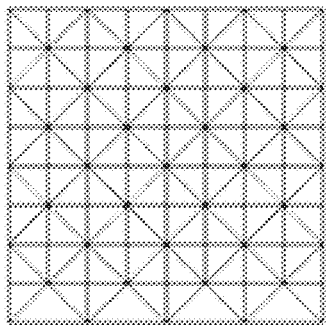
Figure 3:
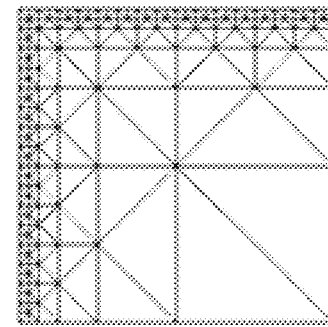
Figure 4:
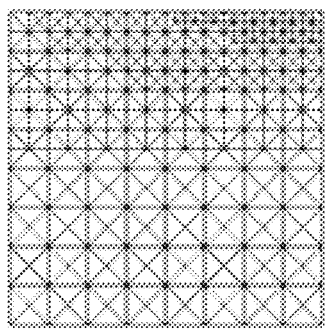
FIG. 4 shows further example results obtained using the improved tessellation method described herein.
Figure 4:
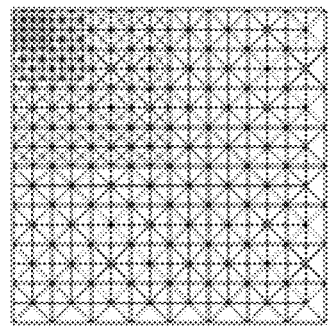
Figure 4:
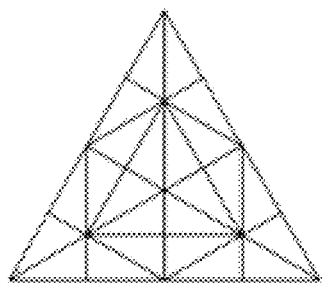
Figure 4:
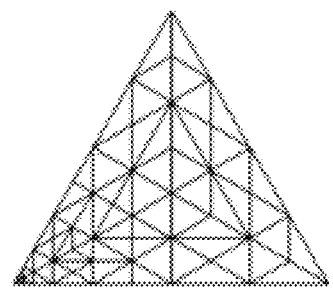
Figure 4:
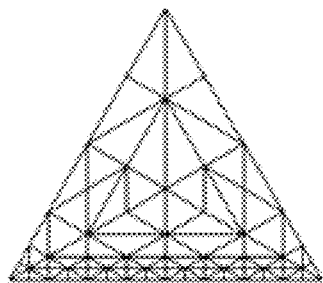
Figure 4:
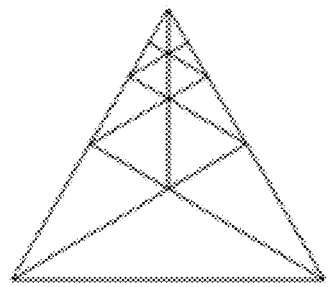
Figure 4:
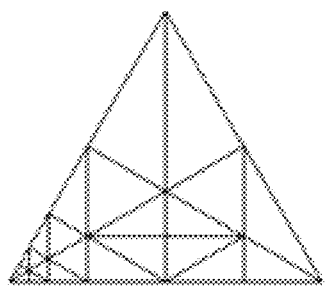
Figure 4:
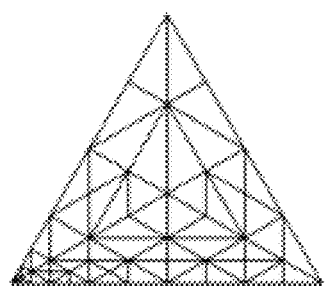

Further examples are shown in FIGS. 3 and 4 with various integer and fractional tessellation factors for both the quad and triangle patch. Note that, for comparison purposes only, in the examples given the numeric vertex tessellation factor is approximately on par to taking the logarithm, base 2, of the factors in the known edge-based tessellation schemes. The text under each example shows the vertex tessellation factors in the following order: (Top Left, Top Right, Bottom Left, Bottom Right) for the quad patch and (Top, Bottom Left, Bottom Right) for the triangle patch. It can be seen from these examples that there is a gradual transition between levels of sub-division within a patch, that there are no long, thin triangles created, and that vertices are placed at their final position in domain space and do not move as the LOD increases (they only appear or disappear at a fixed position in domain space).

As is described below, along with the vertex-based tessellation factors, this improved tessellation method minimizes (or eliminates) undesirable visual artefacts because every vertex (e.g. each new vertex which is added as part of the sub-division into triangles) is always added at its final position in domain space. The result is that vertices do not 'slide' across the surface as in some prior art as the level of detail (and hence TF) changes, which can cause swimming/wobbling artefacts.

Figure 5:
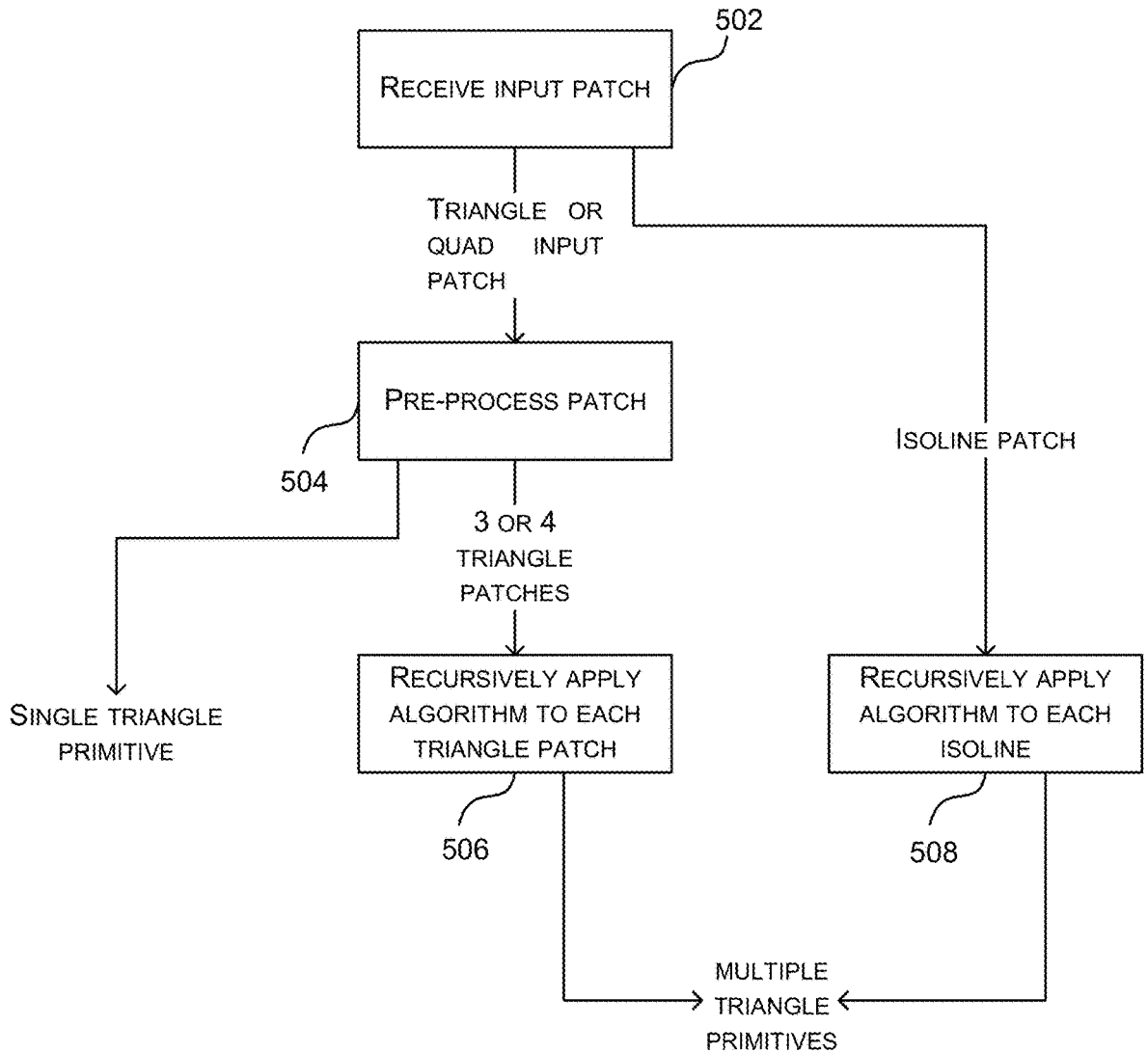
FIG. 5 is a flow diagram of one aspect of the improved tessellation method.
Figure 6:
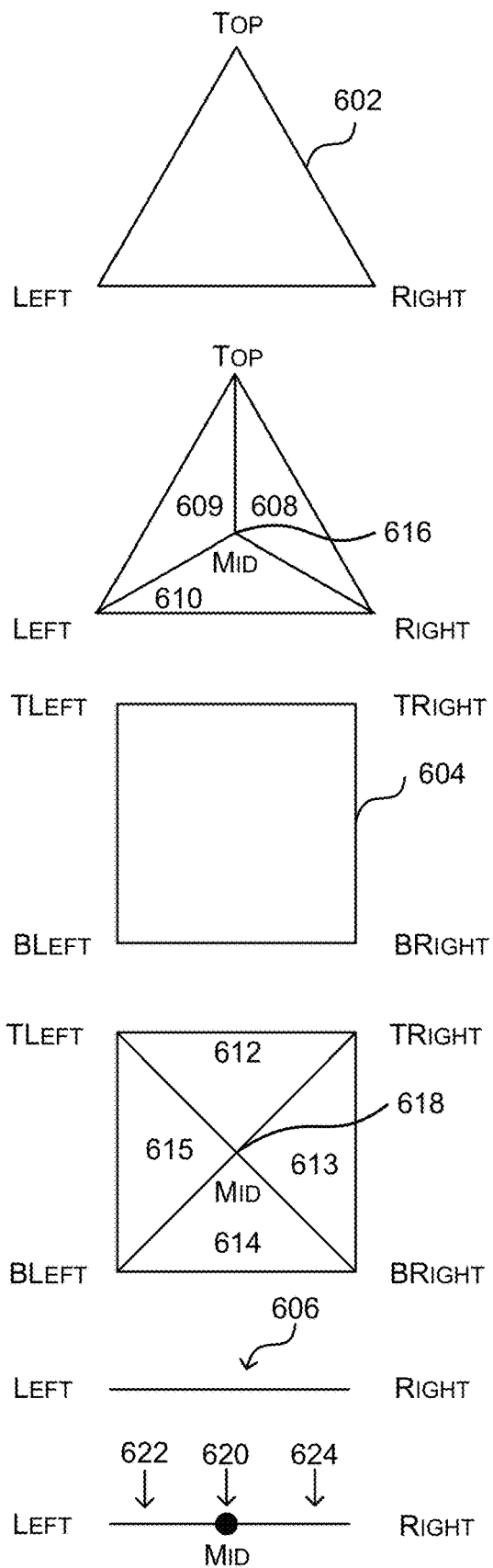
FIG. 6 shows various input patches and illustrating a pre-processing stage of the method of FIG. 5.

FIG. 5 is a flow diagram of the improved tessellation method. The method starts when a patch (referred to as an input patch) is fed into the tessellator. The tessellator (which may be hardware tessellator) receives the input patch (block 502) where this input patch may be a triangle patch 602, a quad patch 604 or an isoline patch 606, as shown in FIG. 6. Whilst the quad patch 606 is a square in domain space (with vertices at (0,0), (1,0), (0,1) and (1,1)), the shape it represents in world space (i.e. within the 3D or 2D environment) may be a different shape. As described above, tessellation is performed in domain space and not in world space.

If the input patch is a triangle patch or a quad patch, the patch undergoes a 'pre-processing' stage (block 504) before the tessellation algorithm is recursively applied to triangle patches within the input patch (block 506). The pre-processing stage is used to ensure tessellation is independent of orientation and as a result is not required for an isoline patch 606 (as the algorithm works symmetrically and so there is no orientation dependence of any resulting tessellation).

If the input patch is a triangle patch 602, the pre-processing stage (block 504) outputs either one triangle patch 602 (which is the same as the input triangle patch and where no tessellation is required) or three triangle patches 608-610. If the input patch is a quad patch 604, the pre-processing stage (block 504) outputs four triangle patches 612-615. If the input patch is an isoline patch, no pre-processing is required (for the reasons set out above) and the tessellation algorithm is recursively applied to the input isoline patch (block 508).

FIGS. 7-10 show the stages of the improved tessellation method in more detail. The method as described uses the following notation:

THRES—a threshold value for tessellation which may, for example, be set to 0.0 or 0.5 where the vertex TF is the value of the amount of tessellation to the log base 2.

VERTEX.TF—the tessellation factor of a vertex which can be any real number (although in various examples, any negative values may be clamped to zero such that the tessellation factor is a non-negative real number). In various examples the vertex TF is at least 0.0 (no tessellation) and at most 6.0 (max tessellation) where the value of the amount of tessellation to the log base 2, e.g. a tessellation factor of 5.0 corresponds to 32 sub-divisions. In other examples, however, the maximum vertex TF may exceed 6.0 (or 64, where log base 2 is not used).

INTERVAL—a non-zero amount by which VERTEX.TF is decreased by after each iteration which may, for example, be set to 0.5 where the vertex TF is the value of the amount of tessellation to the log base 2.

MEAN( )—a symmetric function giving the "mean" of two, three or four vertex tessellation factors. This may be the arithmetic mean or an alternative function and one such alternative is described in more detail below.

For the purpose of the following description, the vertex TF is the amount of tessellation to the log base 2; however, it will be appreciated that it may alternatively written as its actual, full value and in which case the calculations of vertex TFs set out below and the values of the parameters THRES and INTERVAL will be modified accordingly. However, as the hardware implementation is much faster where log base 2 is used, in examples where the input to the tessellator comprises actual vertex TFs (rather than using log base 2), the input vertex TFs may be converted to log base 2 prior to implementing the improved tessellation method described herein.

Figure 7:
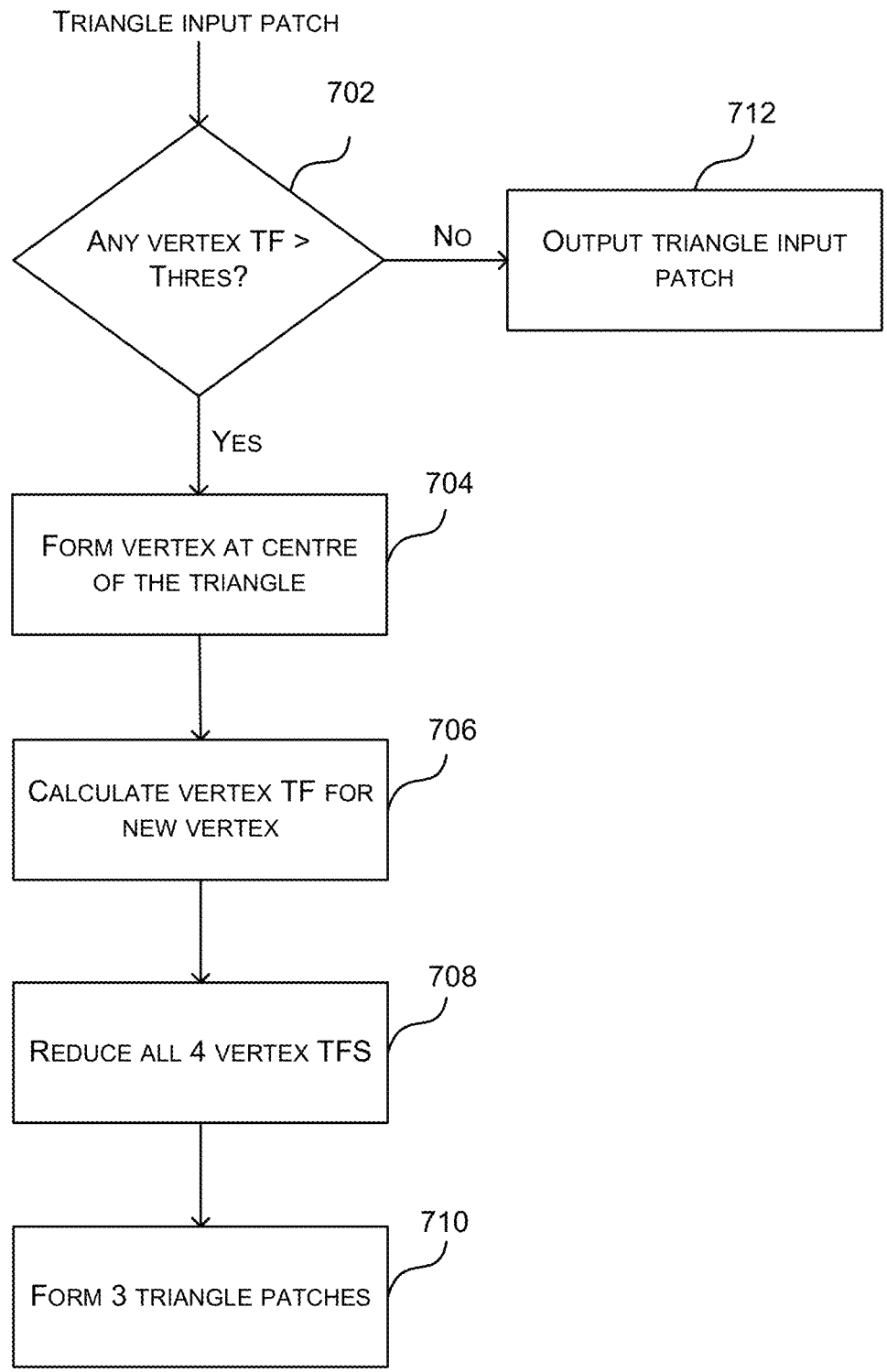
FIG. 7 is a flow diagram of the pre-processing stage of the method of FIG. 5 for a triangle input patch.

FIG. 7 is a flow diagram of the pre-processing stage 504 for a triangle input patch 602 and as shown in FIG. 6, the vertices of the triangle patch may be labelled 'TOP', 'RIGHT' and 'LEFT'. The selection of which vertex is 'TOP' is arbitrary and this pre-processing stage ensures that the algorithm is rotationally and reflectively symmetric (i.e. such that the same tessellation results are achieved irrespective of the order in which vertices are considered in this pre-processing stage).

As shown in FIG. 7, when a triangle patch (TOP, RIGHT, LEFT) 602 is fed into the tessellator and any vertex tessellation factor is greater than the threshold, THRES ('Yes' in block 702) tessellation occurs. A new vertex 616 which is denoted 'MID' is formed at the center (e.g. at the barycenter) of the triangle (block 704) and the vertex TF for the new MID vertex is calculated (in block 706) to be:

$$\text{MID.TF}=\text{MEAN}(\text{TOP.TF},\text{LEFT.TF},\text{RIGHT.TF}) \quad (1)$$

where MID.TF is the vertex TF of the MID vertex, TOP.TF is the vertex TF of the TOP vertex, LEFT.TF is the vertex TF of the LEFT vertex and RIGHT.TF is the vertex TF of the RIGHT vertex. All four tessellation factors (i.e. TOP.TF, LEFT.TF, RIGHT.TF and MID.TF) are then reduced by the parameter INTERVAL (i.e. by subtracting INTERVAL where log base 2 notation is used) as some tessellation has occurred (block 708).

Three triangle patches (MID, RIGHT, LEFT) 610, (MID, LEFT, TOP) 609 and (MID, TOP, RIGHT) 608 are then formed (block 710) and it is these triangle patches which are tessellated using the tessellation algorithm (in block 506) as described below.

If none of the vertex tessellation factors are greater than the threshold, THRES ('No' in block 702) no tessellation occurs. In this situation, the patch simply passes through the tessellator as one primitive (block 712) in order that the method does not over tessellate.

Figure 8:
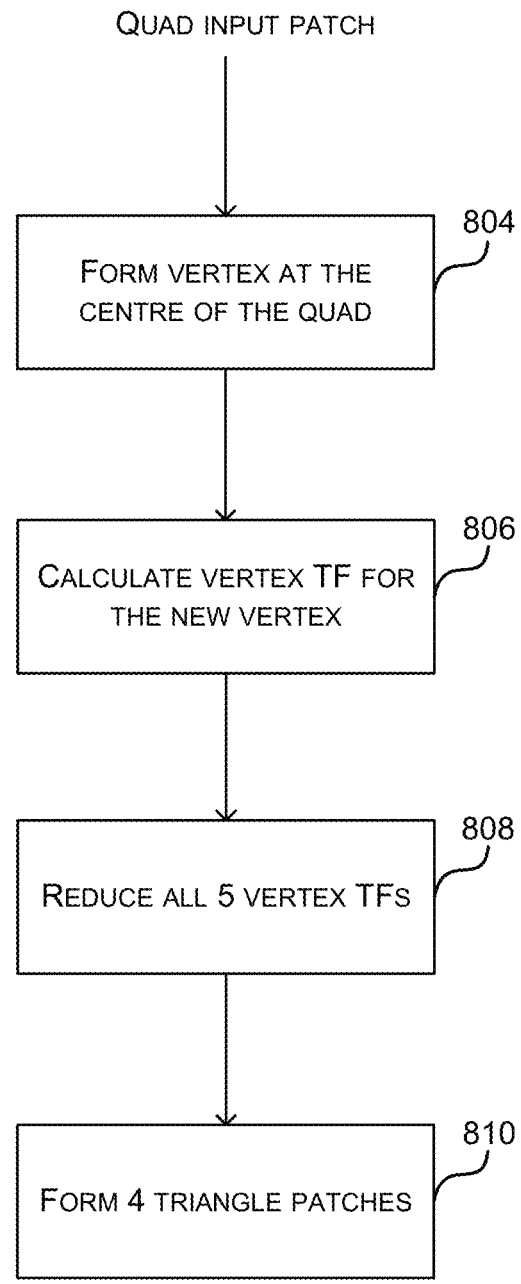
FIG. 8 is a flow diagram of the pre-processing stage of the method of FIG. 5 for a quad input patch.

FIG. 8 is a flow diagram of the pre-processing stage 504 for a quad input patch 604 and as shown in FIG. 6, the vertices of the quad patch may be labelled 'TLEFT' (or top left), 'TRIGHT' (or top right), 'BRIGHT' (or bottom right) and 'BLEFT' (or bottom left). The selection of which vertices are 'top' and which are 'bottom' is arbitrary and this pre-processing stage ensures that the algorithm is rotationally and reflectively symmetric (i.e. such that the same tessellation results are achieved irrespective of the order in which vertices are considered in this pre-processing stage).

As shown in FIG. 8, when a quad patch (TLEFT, TRIGHT, BLEFT, BRIGHT) 604 is fed into the tessellator, a new vertex 618 which is denoted 'MID' is formed at the center of the quad (block 804), i.e. at domain space coordinates (0.5,0.5), and the vertex TF for the new MID vertex is calculated (in block 806) to be:

$$\text{MID.TF}=\text{MEAN}(\text{TLEFT.TF},\text{TRIGHT.TF},\text{BLEFT.TF},\text{BRIGHT.TF}) \quad (2)$$

where MID.TF is the vertex TF of the MID vertex, TLEFT.TF is the vertex TF of the TLEFT vertex etc. All five tessellation factors (i.e. TLEFT.TF, TRIGHT.TF, BRIGHT.TF, BLEFT.TF and MID.TF) are then reduced by the parameter INTERVAL (i.e. by subtracting INTERVAL where log base 2 notation is used) as some tessellation has occurred (block 808).

Four triangle patches (MID, TLEFT, TRIGHT) 612, (MID, TRIGHT, BRIGHT) 613, (MID, BRIGHT, BLEFT) 614 and (MID, BLEFT, TLEFT) 615 are then formed (block 810) and it is these triangle patches which are tessellated using the tessellation algorithm (in block 506) as described below.

Figure 9:
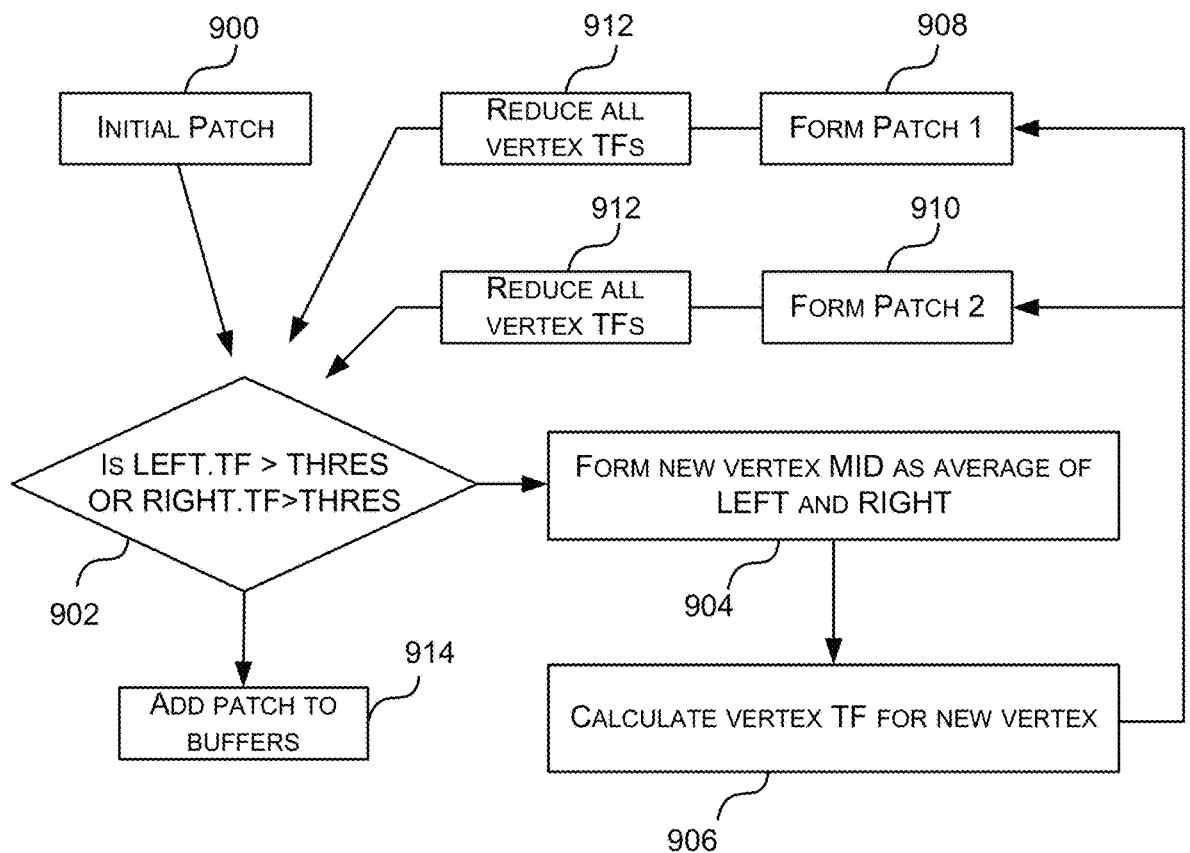
FIG. 9 is a flow diagram of the recursive application of an algorithm to each of the three or four triangle patches output by the pre-processing stage or to an input isoline patch.
Figure 10:
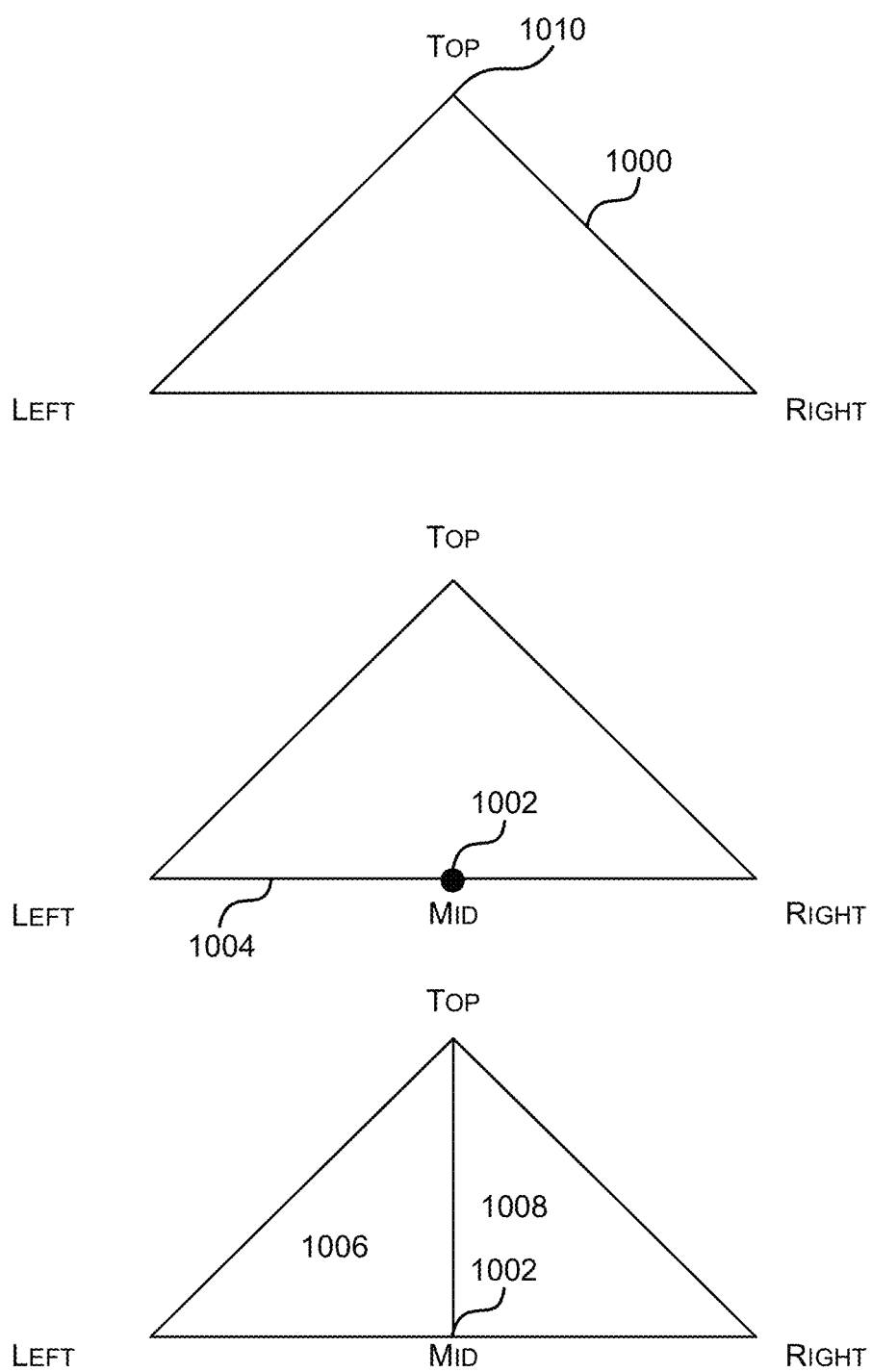
FIG. 10 shows triangles illustrating the method of FIG. 9.

FIG. 9 is a flow diagram of the recursive application of an algorithm to each of the three or four triangle patches output by the pre-processing stage and this can be described with reference to the triangles shown in FIG. 10. As shown in FIG. 10, a triangle patch is an ordered set of three vertices (TOP, RIGHT, LEFT) in a clockwise direction. Note that the first vertex is always the "TOP" vertex and for an initial triangle patch (as output by the pre-processing stage) this 'TOP' vertex corresponds to the 'MID' vertex 608, 618 which is added during the pre-processing (blocks 704, 804).

As shown in FIG. 9, given a triangle patch 1000 (which in the first iteration is initial patch 900) tessellation occurs if and only if $$\text{LEFT.TF}>\text{THRES or RIGHT.TF}>\text{THRES} \quad (3)$$

where LEFT.TF is the vertex TF of the LEFT vertex and RIGHT.TF is the vertex TF of the RIGHT vertex ('Yes' in block 902).

If LEFT.TF>THRES or RIGHT.TF>THRES ('Yes' in block 902), a new vertex MID 1002 is formed (in block 904) which divides the edge LEFT→RIGHT in domain space (indicated by arrow 1004) into two parts. The vertex tessellation factor for the new MID vertex is then calculated (in block 906) to be:

$$\text{MID.TF}=\text{MEAN}(\text{LEFT.TF},\text{RIGHT.TF}) \quad (4)$$

where MID.TF is the vertex TF of the MID vertex, LEFT.TF is the vertex TF of the LEFT vertex and RIGHT.TF is the vertex TF of the RIGHT vertex. For convention the vertices LEFT and RIGHT which define the edge which MID sub-divides are denoted the "parents" of MID.

In many examples, the new vertex MID is added as the bisector as the edge LEFT→RIGHT in domain space. However, in other examples, the new vertex MID may be added at a position which is on the edge LEFT→RIGHT in domain space but which does not exactly bisect it. In various examples, the position of MID along the edge may be weighted, e.g. using the vertex TFs of the parent vertices.

Two sub triangle patches (MID, LEFT, TOP) 1006 and (MID, TOP, RIGHT) 1008 are formed (blocks 908 and 910) and all tessellation factors in each triangle patch 1006, 1008 are reduced by the parameter INTERVAL (block 912, i.e. by subtracting INTERVAL where log base 2 notation is used). The method then recurses on each of these patches. When performing the method on a triangle patch created in block 908 or block 910 the 'TOP' vertex corresponds to the 'MID' vertex 1002 which was added (in block 904) to create the patch and this will be different to the 'TOP' vertex of the parent patch (e.g. patch 1000 can be considered the parent of patches 1006 and 1008 and the 'TOP' vertex 1010 of 1000 is not the same as the 'TOP' vertex 1002 of each of patches 1006 and 1008).

If at any stage no tessellation occurs ('No' in block 902) a primitive (which is the patch) is added to a buffer (block 914), e.g. to an index buffer.

As described above, the method of FIG. 9 is applied to each of the three or four triangle patches which are generated by the pre-processing stage (block 504) and recursively to any patches created by the sub-division of those initial patches.

As the vertex tessellation factors are finite and INTERVAL is constant and non-zero eventually all the vertex tessellation factors (in all the triangle patches) will be at most THRES and the process will terminate.

As can be seen in FIG. 10, the newly added MID vertex is a vertex in both of the two patches which are formed (in blocks 908 and 910) and in both patches this vertex is considered to be the 'TOP' vertex. The current value of the vertex tessellation factor of the newly added MID vertex must be used when recursing into both of the sub-patches. In example implementations that can be ensured either by duplicating the vertex TF for each sub-patch or having a final step to the algorithm in which, for any patch and after recursion on its two sub-patches, each vertex TF is increased by the parameter INTERVAL.

The same algorithm that is used in FIG. 9 may also be applied to an isoline patch (in block 508) although, as described above, no pre-processing is required and in the case of an isoline patch, the algorithm is applied to lines (i.e. isolines and sub-isolines) rather than triangles as can be described with reference to FIG. 6.

If an isoline patch (LEFT, RIGHT) 606 is fed into the tessellator (as initial patch 900) then the line is sub-divided if either LEFT.TF or RIGHT.TF is above THRES ('Yes' in block 902). If either LEFT.TF or RIGHT.TF is above THRES ('Yes' in block 902), a new MID vertex 620 is added which sub-divides (e.g. bisects), in domain space, the LEFT→RIGHT isoline 606 (block 904). A vertex TF for the newly added MID vertex is calculated (in block 906) to be:

$$\text{MID.TF}=\text{MEAN}(\text{LEFT.TF},\text{RIGHT.TF}) \quad (5)$$

where MID.TF is the vertex TF of the MID vertex, LEFT.TF is the vertex TF of the LEFT vertex and RIGHT.TF is the vertex TF of the RIGHT vertex.

The addition of the MID vertex 620 divides the original isoline 606 into two sub-isolines 622, 624 (formed in blocks 908 and 910) and each vertex TF is reduced by 2*INTERVAL (in block 912, e.g. by subtracting 2*INTERVAL where log base 2 notation is used)—note that this reduces the vertex TFs faster than for a triangle patch to produce the correct amount of sub-division. The method then recurses on each of these sub-isolines and terminates when all the vertex tessellation factors will be at most THRES.

The improved tessellation method described above uses a MEAN( ) function. While this could, in some examples, be the arithmetic mean of the vertex tessellation factors, which would result in a smooth introduction of geometry when moving from one vertex to another, such a function would often result in T-junctions appearing and hence cracking for certain values of vertex TF (e.g. where the difference in vertex TFs across a patch is quite extreme). Consequently, in many examples, an alternative function is used for MEAN( ) as follows:

$$\text{MEAN}(TF1,TF2,\ldots)=\text{MIN}(\text{AVG}(TF1,TF2,\ldots),\text{MIN}(TF1,TF2,\ldots)+\text{INTERVAL}) \quad (6)$$

where AVG( ) is the arithmetic mean of a list of values within the parentheses (e.g. vertex TF1, vertex TF2, . . . in the example above) and MIN( ) is the minimum of a list of values within the parentheses (e.g. vertex TF1, vertex TF2, . . . in the example above).

The MEAN( ) function given above is the closest function to the arithmetic mean which ensures no cracking and this can be demonstrated as set out below.

As described above T-junctions within a tessellation can result in cracking and hence it may be desired to ensure that no T-junctions can arise, either in the interior of a domain or along an edge shared by two domains. The improved tessellation method described herein ensures this by guaranteeing that the sub-division of any edge is solely defined by the tessellation factors of the edge end vertices (and by no others). Hence if an edge is shared by two domains (i.e. two adjacent domains) then the domains share its two end vertices (and their vertex tessellation factors) and the same sub-divisions will be produced.

As described above, sub-division occurs only when the end vertex tessellation factors exceed the threshold so no extra sub-division can occur. The only possible problem is if sub-division does not occur when it should due to a previous level of sub-division not happening beforehand and hence, to avoid this problem, it is necessary that the following condition, which refers to a triangle patch 1000 with vertices labelled as shown in FIG. 10, is met:

Tessellation needed on the TOP→LEFT edge implies Tessellation happened on the LEFT→RIGHT edge i.e. (TOP.TF>THRES or LEFT.TF>THRES)
=>(LEFT.TF+INTERVAL>THRES or RIGHT.TF+INTERVAL>THRES)

This condition, without loss of generality, considers the left hand edge only due to symmetry.

It can then be demonstrated that the MEAN( ) function specified above satisfies this condition:

Case 1: If LEFT.TF>THRES then LEFT>TF+ INTERVAL>THRES

Figure 11:
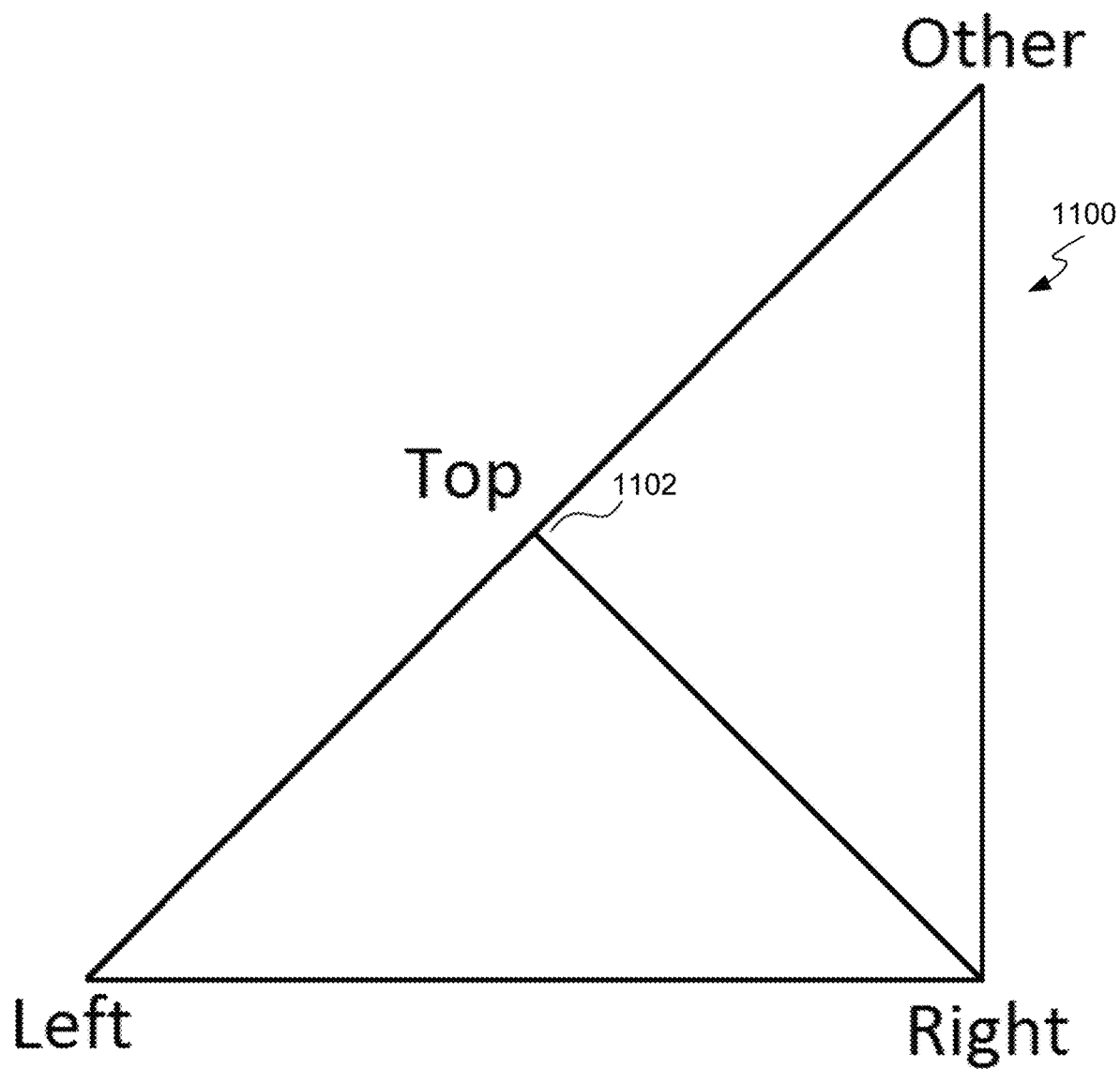
FIG. 11 shows triangles illustrating the improved tessellation method described herein.

Case 2: TOP.TF>THRES has the following two sub-cases:

Case 2.1 (TOP is middle vertex of patch as shown in patch 1000 in FIG. 10 and this corresponds to vertex 616 or 618 in FIG. 6), i.e. TOP.TF=MEAN(LEFT.TF, RIGHT.TF, . . . )) hence THRES<TOP.TF
=MIN(AVG(LEFT.TF, RIGHT.TF, . . . ), MIN(LEFT.TF, RIGHT.TF, . . . )+INTERVAL)
<=MIN(LEFT.TF, RIGHT.TF, . . . )+INTERVAL
<=LEFT.TF+INTERVAL
So LEFT.TF+INTERVAL>THRES Case 2.2 (TOP is made by sub-division with LEFT as an end vertex, as shown in patch 1100 in FIG. 11 where TOP 1102 is made by the sub-division of the edge LEFT→OTHER, i.e. TOP.TF=MEAN(LEFT.TF, . . . )) so THRES<TOP.TF
=MIN(AVG(LEFT.TF, . . . ), MIN(LEFT.TF, . . . )+INTERVAL)
<=MIN(LEFT.TF, . . . )+INTERVAL
<=LEFT.TF+INTERVAL
So LEFT.TF+INTERVAL>THRES In Case 2.2, the same logic can be applied to TOP.TF=MEAN(RIGHT.TF, . . . ) (which corresponds to a reflection of that shown in FIG. 11) to derive that RIGHT.TF+INTERVAL>THRES as desired. Note also that the choice of function is optimal, in that any function that exceeds the minimum plus INTERVAL would not always satisfy these inequalities. Hence the MEAN( ) function cannot be any closer to the arithmetic mean.

Figure 12:
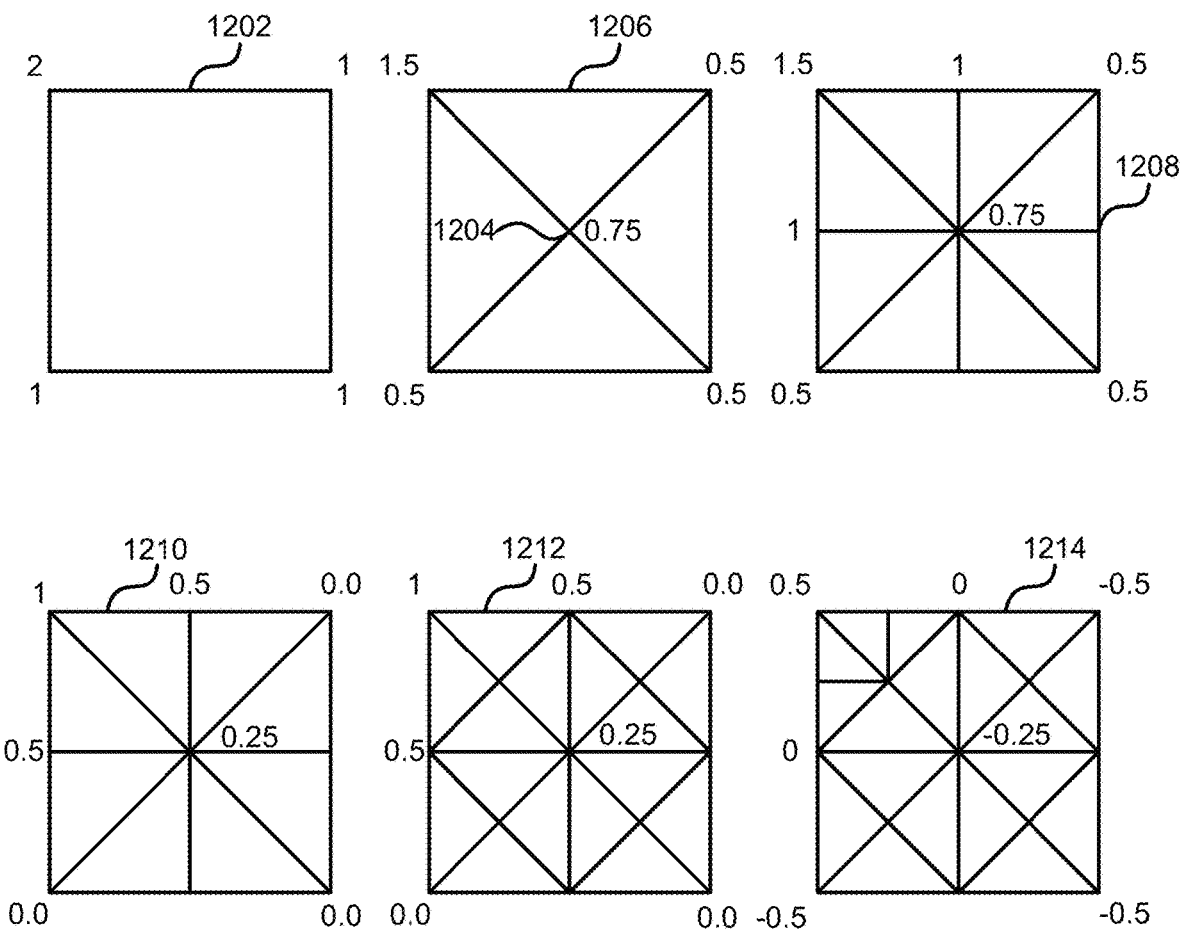
FIG. 12 illustrates examples of the improved tessellation method described herein.

The improved tessellation method can be further described by way of an example of tessellating a quad 1202 with tessellation factors (2, 1, 1, 1) using the log base 2 notation and THRES=0.0 and INTERVAL=0.5 as shown in FIG. 12. In the pre-processing stage (block 504 and FIG. 8) the middle vertex 1204 is added (in block 804) with tessellation factor 1.25 (the arithmetic mean, calculated in block 806). Four triangle patches are formed (in block 810) with the middle as the top vertex of each patch, reducing each TF by 0.5 (in block 808, which may be performed before or after block 810) as shown in the second example 1206 in FIG. 12.

In a first recursion on each of the triangle patches (block 506 and FIG. 9), each bottom edge is sub-divided (in block 904, as 0.5 is above the threshold THRES=0.0) and four new vertices (with new vertex TFs) and eight new patches are formed (in blocks 904-910) as shown in the third example 1208 in FIG. 12. All tessellation factors are then decreased by 0.5, the value of INTERVAL (in blocks 912) as shown in the fourth example 1210 in FIG. 12.

In a next recursion on each of the eight triangle patches, the bottom edge of each of the eight patches is sub-divided (in block 904, as 0.25 is above THRES) by adding new vertices, calculating vertex TFs for those new vertices and forming 16 new patches as shown in the fifth example 1212 in FIG. 12. All tessellation factors are then decreased by 0.5 again (in blocks 912) and in a further recursion, the final two sub-divisions are made (as shown in the final example 1214 in FIG. 12), where only the top left vertex tessellation factor (0.5) is above the threshold. After this step all vertex tessellation factors are at most 0 (and as shown in FIG. 12 the vertex TFs can be negative) and the process terminates.

As the improved tessellation method described above treats each patch independently, it can be implemented with a high degree of parallelism. Like any tessellation method, vertices shared along a domain boundary may be cached so that they are not duplicated. As the method is recursive, the amount of chip (e.g. Silicon) space and memory required is minimal. Example requirements are outlined below:

| Step | Operation | Sub Op | Sub Op | # | Parameter Types | Time/ Space Complexity |
|---|---|---|---|---|---|---|
| Is LEFT.TF > THRES or RIGHT.TF > THRES (block 902) | Comparison | | | 2 | Fixed Point | O(1) |
| Form new vertex MID as average of LEFT and RIGHT (blocks 904 and 906) | Arithmetic Mean | MEAN() of tessellation factors | MIN() AVG() Addition | 1 2 1 1 | Fixed Point Fixed Point Fixed Point Fixed Point | O(1) O(1) O(1) O(1) |
| Form Patch ½ (blocks 908 and 910) | Assign Vertices | | | 3 | Vertex | O(1) |
| Add Patch to Buffers (block 914) | Add Vertices to Output Vertex Buffer | | | 3 | Vertex | O(α(M)) |
| | Add Indices to Output Index Buffer | | | 3 | UINT | O(1) |

The extra vertex members required for the proposed method is a Fixed Point Tessellation Factor for each input vertex. M is the current size of the output vertex buffer and α( ) is some function of M depending on how the buffer is structured. α( ) is typically something between log(M) and M.

Figure 13:
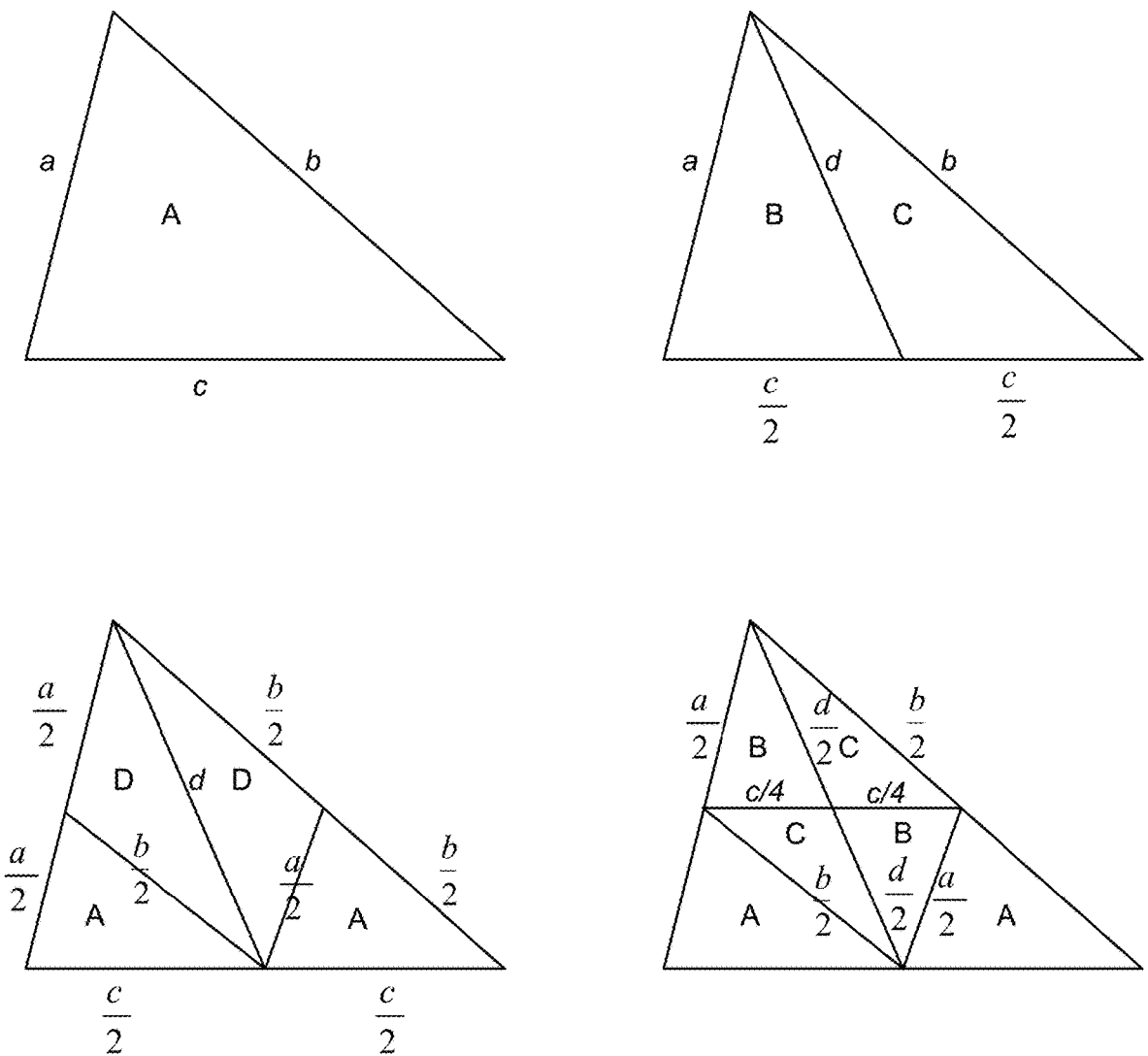
FIG. 13 shows the triangle classes that may be generated using the improved tessellation method described herein.

As described above, the minimum number of cycles to render is achieved when rendering equilateral triangles or those with high Root Area to Perimeter Ratio. Similarly worst performance occurs as the Root Area to Perimeter Ratio vanishes, e.g. degenerate triangles. For a given triangle patch with edge lengths a, b and c the proposed method yields at most four different classes of triangle (up to similarity) A (with sides in the ratio a:b:c), B (with sides in the ratio (a:d:c/2), C (with sides in the ratio d:b:c/2) and D (with sides in the ratio a/2:b/2:d) as shown in FIG. 13. In the case that the patch is isosceles (i.e. a=b) then B is similar to C and hence there are only three classes. If the patch is both isosceles and right angled at the top vertex then there is total similarity (i.e. there is only a single class of triangles). In all cases the number of triangle classes is finite; hence the minimum Root Area to Perimeter Ratio is bounded and cannot vanish unless the patch itself is degenerate. In contrast many known tessellation methods have no lower bound on Root Area to Perimeter Ratio and indeed vanishing triangles occur in abundance.

Figure 14:
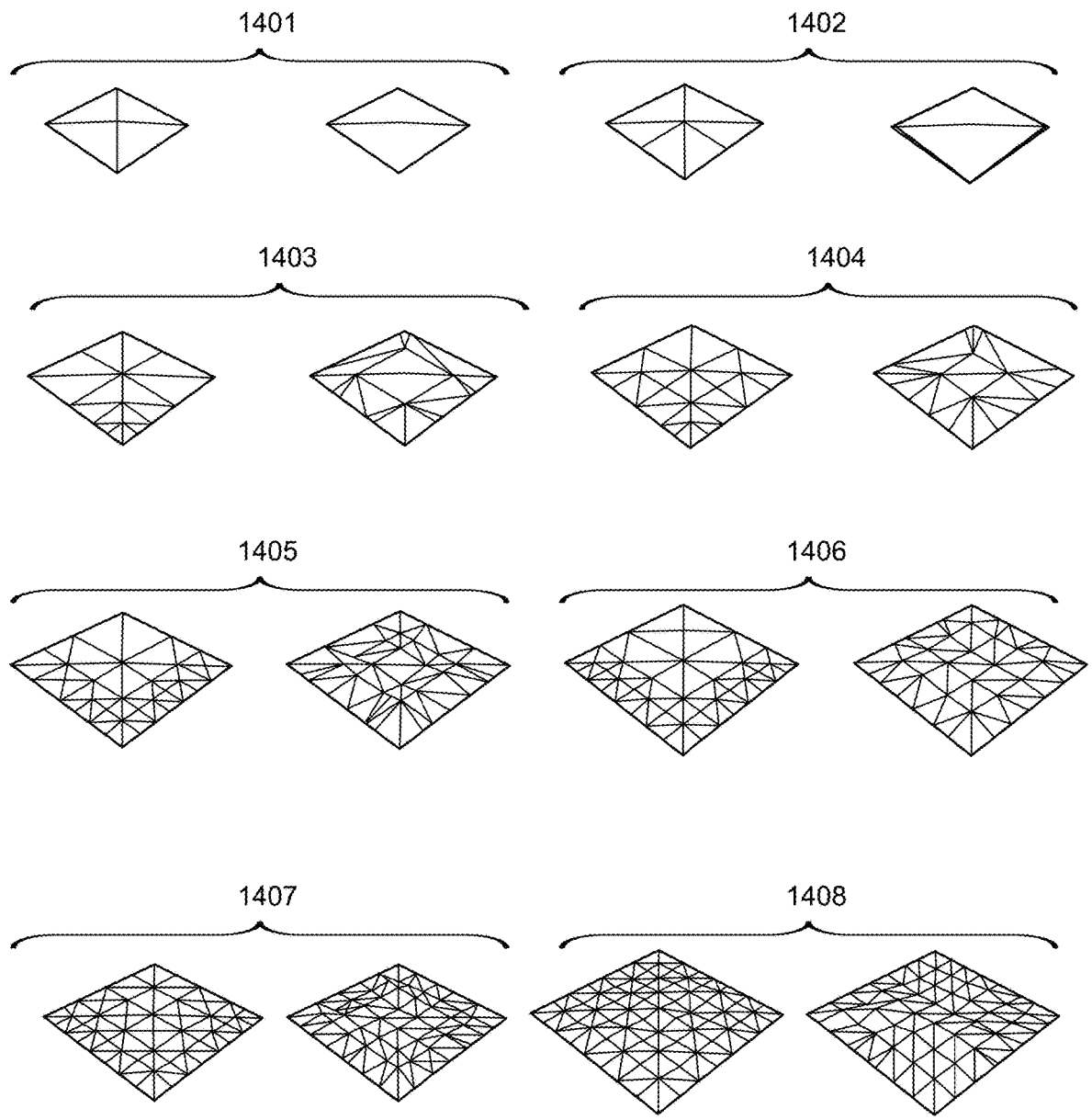
FIG. 14 shows a comparison between the results obtained using the improved tessellation method described herein and a known tessellation method.

FIG. 14 shows a comparison between the results obtained using the improved tessellation method described herein and a known tessellation method, Odd fractional partitioning (as described above with reference to FIG. 1). Eight separate comparisons 1401-1408 are shown and each time the results obtained using the improved tessellation method are shown on the left and the results obtained using odd fractional partitioning are shown on the right.

As shown in the first comparison 1401 the improved tessellation method starts with two more primitives than odd fractional partitioning to ensure tessellation is independent of orientation. As described above, these four triangular primitives are generated in the pre-processing stage (block 504). Tessellation using the algorithm (in block 506) in the improved tessellation method begins by dividing two patches into similar triangles, as shown in the second comparison 1402. In contrast, in odd fractional partitioning (shown on the right) tessellation begins with adding 12 new thin triangles, all nearly redundant (because they are so thin that nearly the entirety of the domain is made up by just two primitives, as is clearly visible in the second comparison 1402, which means that these thin triangles do not, after displacement, add any detail to the majority of the domain) and then adding many more triangles, as shown in comparison 1403.

As shown in the subsequent comparisons 1403-1408 the improved tessellation method continues to add similar triangles of half area to approximate the increase in tessellation factors. Odd fractional partitioning continues to add an excess of initially redundant thin triangles to accomplish the same. The improved tessellation method introduces vertices which do not move in the domain space. In odd fractional partitioning, in contrast, vertices begin on top of old ones and grow out into position and as a result the geometry appears to undulate. The improved tessellation method settles into a criss-cross pattern as shown in the final comparison 1408, whereas odd fractional partitioning continues to add entire rows and columns of vertices at every odd LOD/TF, which in turn moves all vertices in the domain space.

Figure 15:
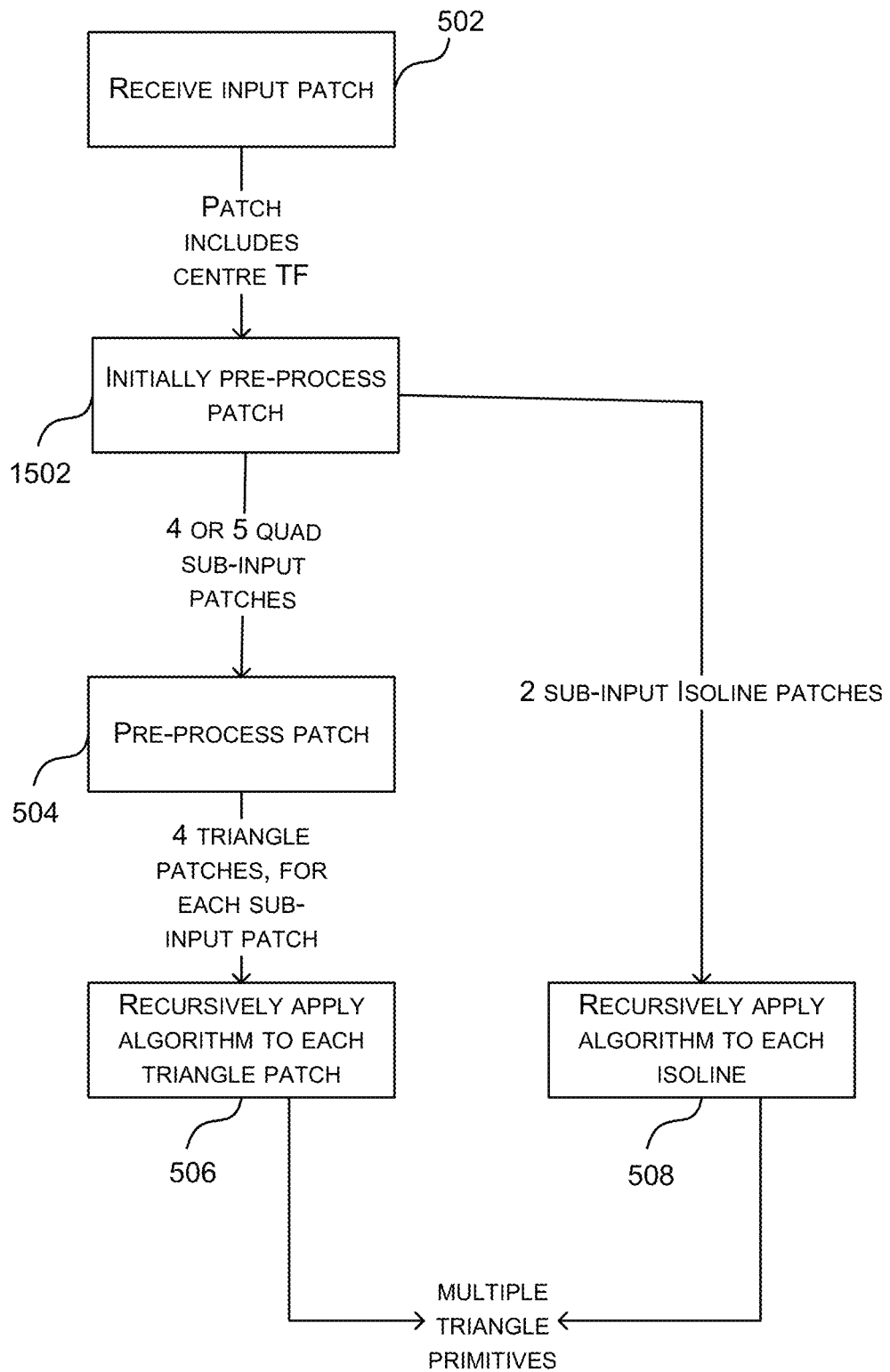
FIG. 15 is a flow diagram of an alternate improved tessellation method to that shown in FIG. 5.

It may sometimes be desirable to allow a user to specify a center TF for a patch that differs in LOD from the vertex TFs of the corners of the patch, particularly in animation. This could, for example, be used to better approximate the height map associated with a texture over a quad or triangle patch, for example if the map had a very sharp jump in the middle in the case of a creature's spike. FIG. 15 shows a variation on the method of FIG. 5 (as described above) which adds a further, optional, pre-processing stage (block 1502) which enables use of center TFs for quad or triangle patches. As shown in FIG. 15, this additional pre-processing stage (in block 1502) is implemented prior to the pre-processing stage (in block 504) described above and divides the input patch (which may be a quad or triangle). Unlike the original pre-processing stage (block 504), the additional pre-processing stage (block 1502) may also be applied to isolines; however it is less useful in this context. In the case of isolines, the isoline is sub-divided and the newly added middle vertex is allocated the center TF. The sub-division then proceeds as described above on the two sub-isolines (e.g. LEFT-MID and MID-RIGHT).

Figure 16:
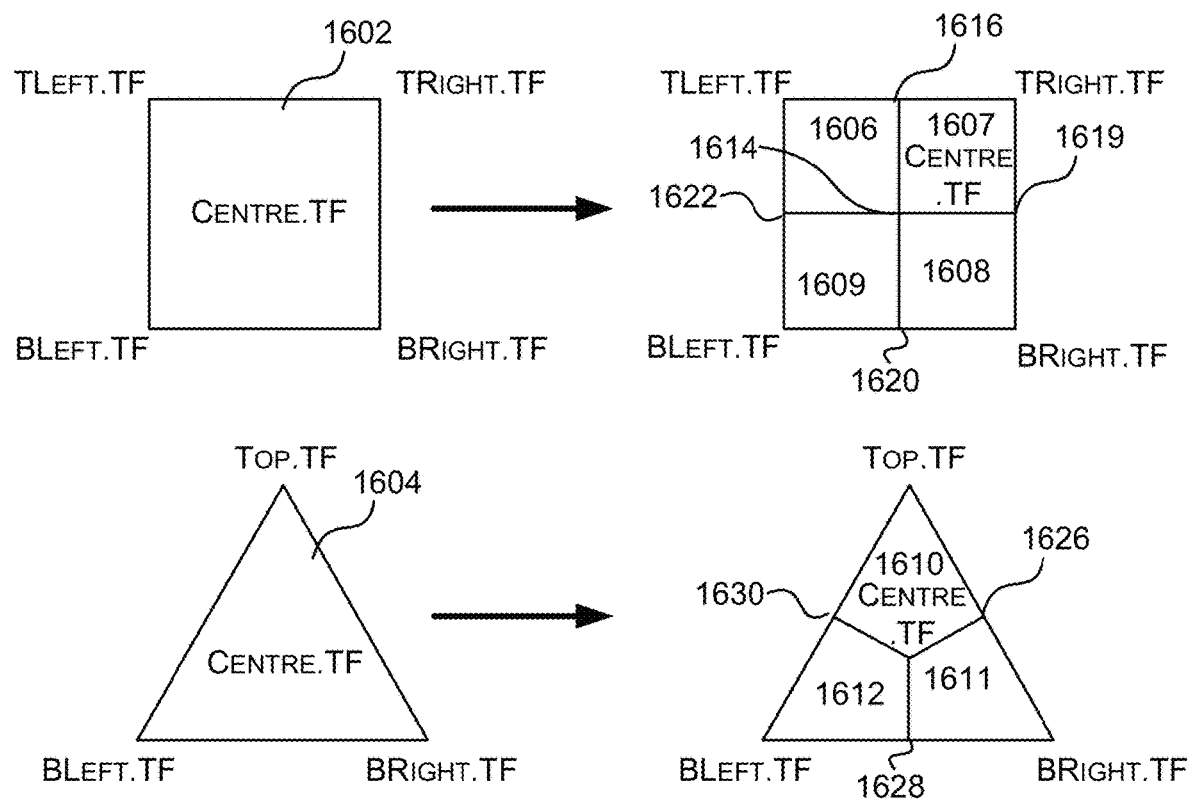
FIG. 16 shows an example of the method of FIG. 15.
Figure 17:
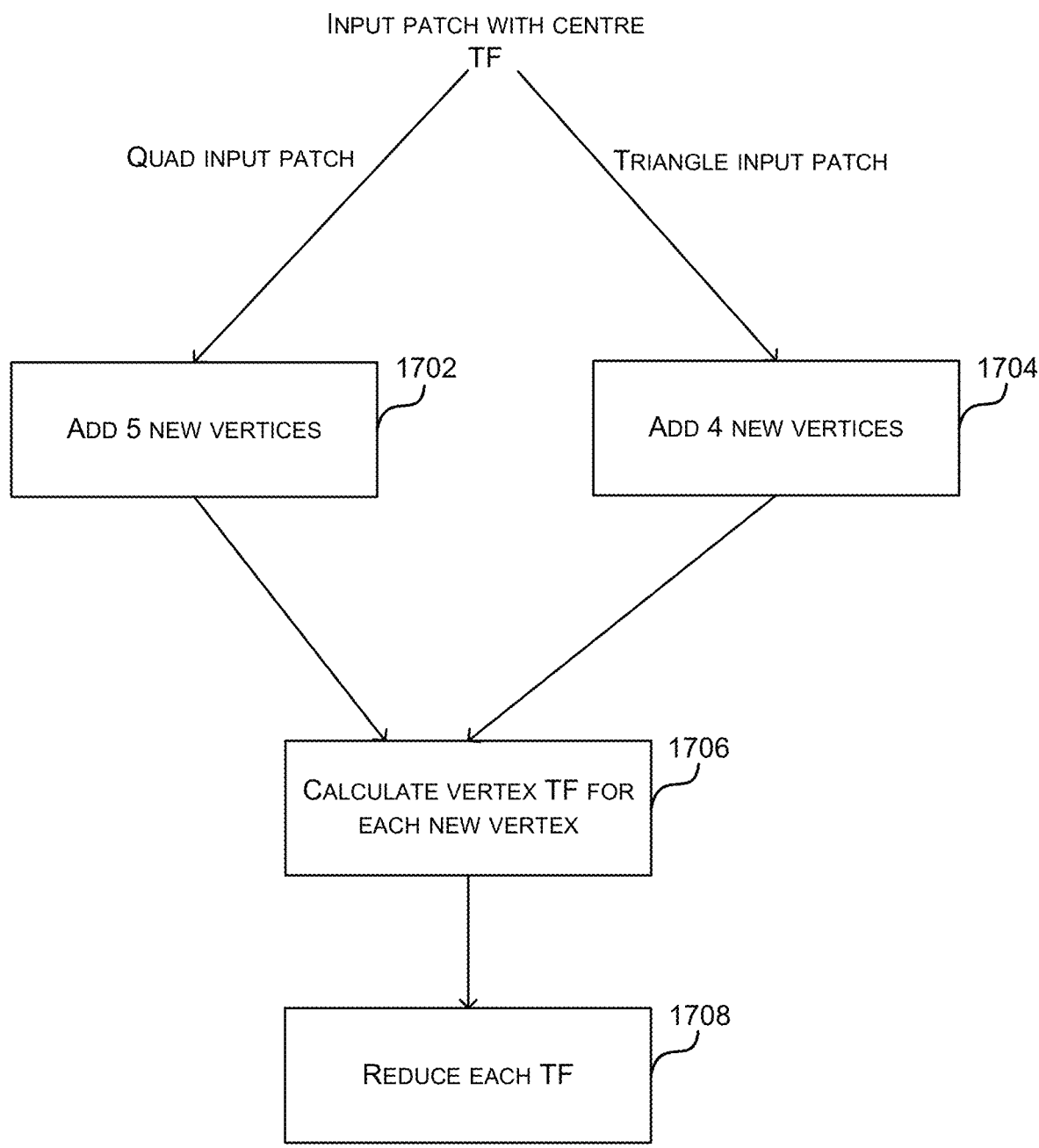
FIG. 17 is a flow diagram of the additional pre-processing stage of the method of FIG. 15.

The additional pre-processing stage (block 1502) can be described with reference to the FIGS. 16 and 17. FIG. 16 shows schematic diagrams of the application of the stage to a quad input patch 1602 or a triangle input patch 1604 and FIG. 17 shows a flow diagram of the additional pre-processing stage. With center tessellation factors enabled, the user must supply to the tessellator a Center TF per patch as well as the vertex TFs for each corner vertex (three for a triangle patch and four for a quad patch).

As shown in FIG. 16, the additional pre-processing stage divides a quad input patch 1602 into four quad patches 1606-1609 and a triangle input patch 1604 into three quad patches 1610-1612. To achieve this, pre-processing the quad input patch 1602 requires adding five new vertices (block 1702): the center vertex 1614 (shared by all four sub-domains 1606-1609) with the Center TF, a mid-top vertex 1616, a mid-right vertex 1618, a mid-bottom vertex 1620 and a mid-left vertex 1622. Their tessellation factors are calculated (in block 1706) for each newly added vertex, by taking the MEAN( ) of the newly added vertex's adjacent corner TFs. In various examples the MEAN( ) function given by equation (6) may be used as it results in more consistent tessellation patterns; however, in other examples the arithmetic mean may be used.

Pre-processing a triangle input patch 1604 requires adding four new vertices (block 1704): the center vertex 1624 (shared by all three sub-domains) with the center TF, a mid-right vertex 1626, a mid-bottom vertex 1628 and a mid-left vertex 1630. Their tessellation factors (as calculated in block 1706) are given, for each newly added vertex, by taking the MEAN( ) of the newly added vertex's adjacent corner TFs. As described above, in various examples the MEAN( ) function given by equation (6) may be used as it results in more consistent tessellation patterns; however, in other examples the arithmetic mean may be used.

The last stage of the additional pre-processing stage (block 1708) reduces each tessellation factor and in various examples, each TF is reduced by 2*INTERVAL. This reduction of the TFs (prior to input to the original pre-processing stage of block 504) ensures that the correct number of sub-divisions is made on each boundary edge of the patch and to indicate that tessellation has occurred.

Figure 18:
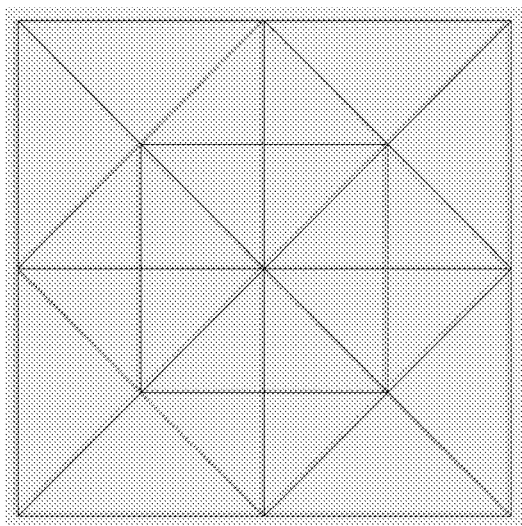
FIG. 18 shows example results obtained using the method of FIG. 15.
Figure 18:
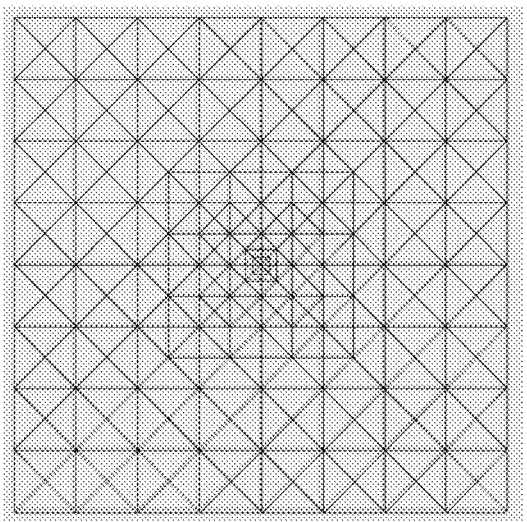
Figure 18:
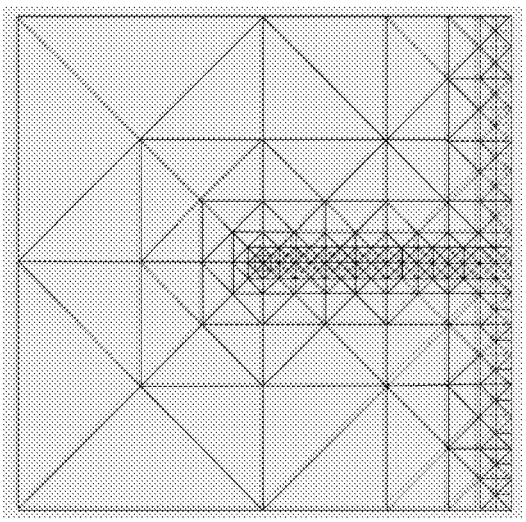
Figure 18:
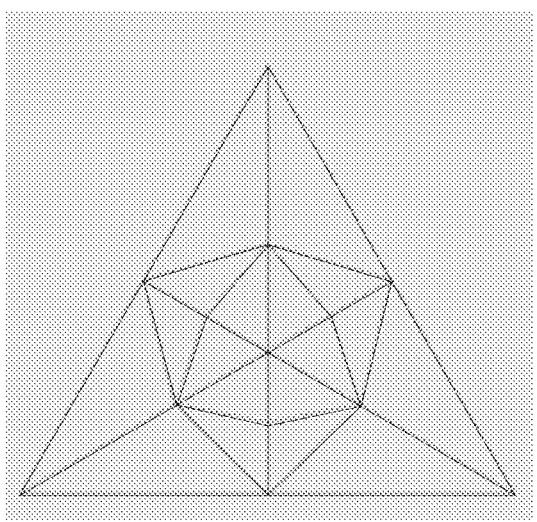
Figure 18:
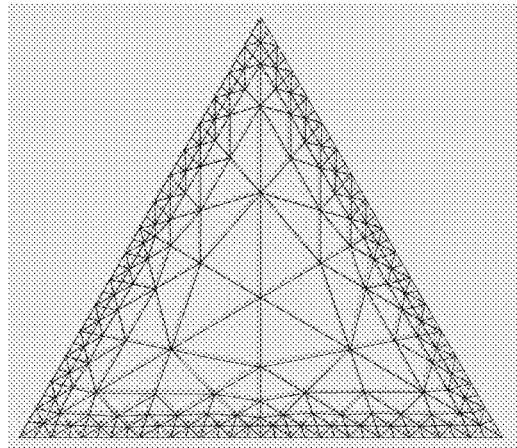
Figure 18:
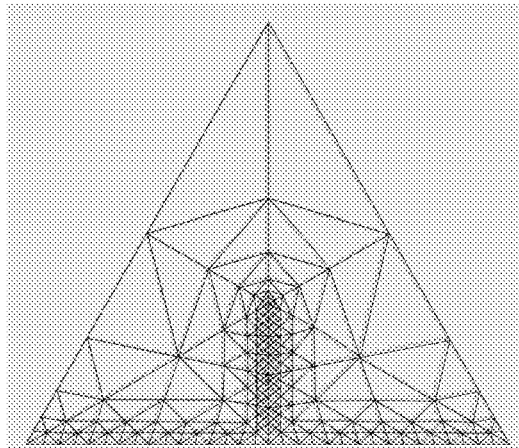

Having sub-divided the original input patches into three or four quad patches, in the additional pre-processing stage (block 1502), these three or four quad patches (with their vertex TFs as calculated in block 1708) are input to the original pre-processing stage (block 504) as if they were original input patches and the method proceeds as described above. FIG. 18 shows various example tessellations which may be obtained using the method of FIG. 15.

Due to the fact that the additional pre-processing stage (block 1502 and FIG. 17) sub-divides each domain edge at least once, even with TFs of 0.0, any single connected mesh should be tessellated either completely with or without center TFs to ensure no cracking can occur (i.e. all patches in the single connected mesh should use the same method, i.e. they should all use the method of FIG. 5 or the method of FIG. 15 and not have some input patches using the method of FIG. 5 and others using the method of FIG. 15).

The improved tessellation method described herein addresses one or more of the problems detailed above which arise in known tessellation methods. In various examples, the improved tessellation method may address many or all of the problems detailed above, as follows:

No snapping—using the improved tessellation method, geometry is added by small increments as tessellation factors increase to produce a smooth transition. This helps with the prediction of rendering times.

No cracking—as demonstrated above, the improved tessellation method produces no T-junctions either within a domain or along the boundary of a domain.

No swimming—each vertex that is introduced by the tessellator maintains its domain space position as tessellation factors increase and hence there are no "swimming" artefacts.

No over/under tessellation—an integer vertex tessellation factor t at each end of an edge corresponds to $2^t$ sub-divisions. Also, an average vertex tessellation factor of t on a quad approximately corresponds to $2^{2t}$ vertices and twice that many primitives which is minimal. Similarly a triangle patch corresponds to $\frac{3}{4}2^{2t}$ vertices and twice as many primitives.

No thin triangles—as described above the improved tessellation method only produces four (or fewer) classes of triangle per patch and this bounds the minimum of the Root Area to Perimeter Ratio per patch.

Space/time complexity—the algorithm is recursive (as shown in FIG. 9) and each sub-domain/patch can be treated independently which supports substantial parallelism. Input vertices require an extra fixed point value for the vertex tessellation factor.

In addition, the improved tessellation method described herein has, in various examples, the following further qualities:

Orientation independent—by splitting the patch into a fan of triangle patches with the middle vertex as the top of each (in the pre-processing stage, block 504), no choice is made on the orientation of the triangles, so the same tessellation will always be produced.

N-gons—the improved tessellation method may be easily adapted to support any polygon patch with N sides by splitting the patch into a fan of triangles (in a variation of the pre-processing stage 504). In each case, for an average tessellation factor t, the method would generate approximately $$\frac{N}{4}2^{2t}$$

vertices and twice as many primitives.

Although the examples above show (e.g. in FIG. 5) the improved tessellation method being implemented for triangle, quad and isoline patches, it will be appreciated that the method may be implemented for only a subset of those patches (e.g. only for quad patches, only for triangle patches or only for quad and triangle patches).

Although FIG. 5 shows the improved tessellation method which comprise both the pre-processing stage (block 504) and the recursive application of the tessellation algorithm (in blocks 506 and 508), it will be appreciated that the method shown in FIG. 9 may alternatively be implemented independently without the pre-processing stage (block 504 and as shown in FIGS. 7 and 8) or alternatively the pre-processing stage (block 504) may be implemented in a different manner to that shown in FIGS. 7 and 8. Similarly, where center tessellation factors are used (as shown in FIG. 15), the method may be implemented without the pre-processing stage (block 504 and as shown in FIGS. 7 and 8) or alternatively the pre-processing stage (block 504) may be implemented in a different manner to that shown in FIGS. 7 and 8.

In further variations of the improved tessellation method described above, vertex tessellation factors may be represented differently, i.e. by transforming them by one or more scalings, translations or other transformations. Generating updated vertex tessellation factors (e.g. in blocks 708, 808 and 912) would therefore differ from subtracting by INTERVAL, e.g. the vertex TFs may be represented by raising two to their power and updating them by dividing by root two. More generally for any F(x), an invertible function on the reals, the tessellation factors TF' may be given by: TF'=F(TF). Instead of subtraction by INTERVAL, the following function may be used to update the vertex TFs (as calculated in blocks 708, 808 and 912):

TF':=F(F$^{-1}$(TF')−INTERVAL)

In this example, the test condition (instead of that given by equation (3) above) would be TF'>F(THRES) or TF'<F(THRES) where the choice of inequality depends upon whether F is order preserving or reversing. By conjugating by F( ) there is no semantic difference in the method.

In an example, if TF'=F(TF)=$2^{TF}$ (i.e. no longer working in log base 2), then the function used to update the vertex TFs (e.g. in blocks 708, 808 and 912) would be:

$$2^{log_2 TF'-0.5} = \frac{TF'}{2^{0.5}} = \frac{TF'}{\sqrt{2}}.$$

The test condition would then be TF'>$2^0$=1 as $2^{TF}$ is order preserving.

Whilst specific examples are provided for the values of THRES and INTERVAL in the description above, in further examples, different values of one or both of these parameters may be used.

In the examples above, two possible MEAN( ) functions are described: the arithmetic mean and the MEAN( ) function given by equation (6) above. In further example implementations of the improved tessellation method described herein, another function may alternatively be used as the MEAN( ) function which may be symmetric or non-symmetric (although this would result in a loss of orientation independence).

Although the examples above use a single value for each of THRES and INTERVAL and a single MEAN( ) function (e.g. either the arithmetic mean or the MEAN( ) function given by equation (6)), further examples may use multiple values for THRES and/or MEAN and/or multiple MEAN( ) functions.

In the improved tessellation method described above, a new vertex is added if LEFT.TF or RIGHT.TF exceeds THRES (and where the 'or' is used, e.g. in equation (3), in its standard meaning that if either one or both of LEFT.TF and RIGHT.TF exceed the threshold, a new vertex is added). In a variation on the examples described above, tessellation may only be performed if both LEFT.TF and RIGHT.TF exceed THRES.

Whilst in the improved tessellation method described above, a new vertex is added if LEFT.TF or RIGHT.TF exceeds THRES (as in equation (3) above), it will be appreciated that in a variation on the method described, a new vertex maybe added if LEFT.TF or RIGHT.TF exceeds or is equal to THRES.

In the above description, the sub-division is described as being recursively applied (e.g. in blocks 506 and 508). In further examples, however, the method may not be applied recursively, e.g. it may be applied iteratively (where a single level of sub-division is performed on all current patches before the next level of sub-division is performed on all generated patches). In another example, another non-recursive method may be implemented such as testing whether each vertex on a 65 by 65 grid should be included and then working out which primitives any included vertex is part of based on the position of the vertex.

In the examples described above, the improved tessellation method is described as being performed in domain space. In a further variation on the method described, the tessellation may alternatively be applied outside of domain space.

The vertex TFs that are input to the improved tessellation method may be generated by a separate application (e.g. based on the distance of the viewer from each vertex, for example the vertex TF for a vertex may be proportional to the reciprocal of the distance of the vertex from the eye). In various examples, an API may be provided which converts edge TFs into vertex TFs (e.g. by taking averages of all the edge TFs for edges which meet at the vertex) before inputting them into the methods described herein.

The improved tessellation method described herein may be used to perform tessellation on-the-fly (e.g. as the viewpoint changes within a 3D scene) or alternatively the methods may be used offline to pre-compute triangles for a number of different viewpoints.

Figure 19:
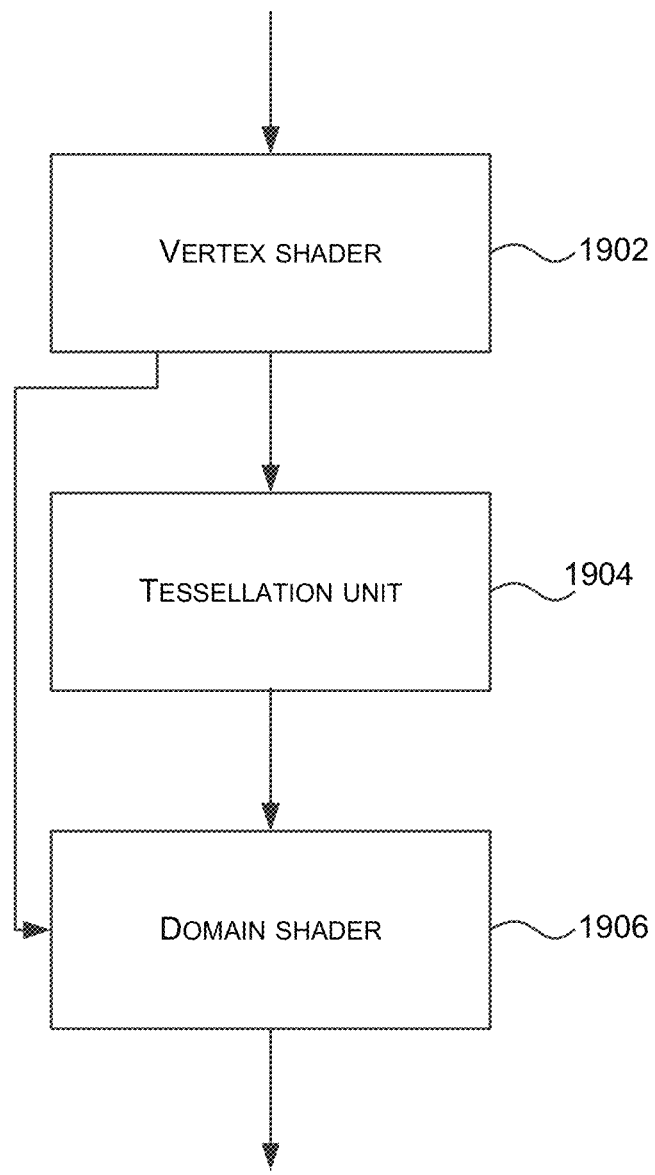
FIG. 19 is a schematic diagram of an example GPU pipeline.

The improved tessellation method described herein may be implemented in hardware. In various examples, the methods may be implemented in a hardware tessellation unit within a graphics processing unit (GPU) as shown in FIG. 19. FIG. 19 shows a schematic diagram of an example GPU pipeline 1900 which may be implemented in hardware within a GPU. As shown in FIG. 19, the pipeline 1900 comprises a vertex shader 1902 which is responsible for performing per-vertex calculations, including calculating vertex tessellation factors for all of these vertices (e.g. as a function of the vertex's position from the camera). Prior to calculating the vertex TF the vertex shader transforms the vertex into world space and may apply one or more other linear transforms. The vertex shader 1902 has no knowledge of the mesh topology and only knows the current vertex that has been fed into it.

Between the vertex shader 1902 and the hardware tessellation unit (or tessellator) 1904 (or between the vertex shader and an optional hull shader, not shown in FIG. 19, where the pipeline 1900 comprises one or more optional Hull Shaders between the vertex shader 1902 and the tessellator 1904) a patch (i.e. an ordered set of vertices) is built using the Topology (where this may be a pre-built selection stored in the tessellator which the user chooses before draw calls). This patch information is passed to the hull shader (where provided). The tessellator 1904, however, only takes the vertex TFs and the rest of the patch information is passed onto the domain shader 1906.

The hardware tessellation unit (or tessellator) 1904 comprises hardware logic to implement the improved tessellation method described above (e.g. as shown in FIGS. 5, 7-9, 15 and 17) using the received vertex TFs. Unlike the vertex shader, the hardware tessellation unit (and any optional Hull Shaders) operates per-patch and not per-vertex. In order to simplify the hardware required to implement the equations for calculating new vertex TFs (e.g. in blocks 706, 806, 906 and 1706), the calculations may be performed in log 2 (as in the examples described above) and so can be implemented as additions and subtractions (otherwise, multiplications and divisions would be used). As described above, the hardware tessellation unit 1904 may be configured to perform aspects of the methods described above in parallel (e.g. the recursions on different patches in blocks 506 and 608, e.g. as shown in FIG. 9). The hardware tessellation unit 1904 outputs the domain space coordinate for each new vertex and passes it onto the domain shader 1906 (e.g. by storing, in a buffer, details of every patch, as in block 914 of FIG. 9).

The domain shader 1906 acts as a second vertex shader for vertices produced by the tessellator 1904 and is executed once per vertex generated by the tessellator. The domain shader supplies a domain space location (u,v) and gives all patch information and outputs a full vertex structure. The domain shader uses the patch control points and the domain space coordinates to build the new vertices and applies any displacement mapping (e.g. by sampling some bump or height map encoded in a texture).

After the domain shader 1906 has run for each generated vertex of each patch, the vertices are passed on to the rasterizer (not shown in FIG. 19). In tandem, primitives (in the form of index buffers) are passed from the tessellator to the rasterizer.

The GPU pipeline 1900 of FIG. 19 is shown by way of example only and the improved tessellation method described herein which uses vertex TFs can be used in any GPU architecture. It will also be appreciated that the hardware tessellation unit 1904 may be used in a GPU pipeline which comprises other shaders in addition to, or instead of, a vertex shader 1902, an optional hull shader and a domain shader 1906.

According to one embodiment, INTERVAL=0.5.

According to another embodiment, the threshold value is zero.

According to yet another embodiment, the input patch is a triangle patch having three vertices and wherein generating one or more initial patches comprises: comparing a vertex tessellation factor of each of the three vertices to a threshold value; in response to determining that none of the vertex tessellation factors exceed the threshold value, outputting data describing the input patch; and in response to determining that at least one of the vertex tessellation factors exceed the threshold value, forming a new vertex at a center of the triangle, calculating a vertex tessellation factor for the new vertex, dividing the input patch to form three initial patches, each initial patch being a triangle patch with the new vertex as the top vertex and reducing the vertex tessellation factor of each vertex in each of the newly formed initial patches.

According to yet another embodiment, the new vertex is formed at a barycenter of the triangle.

According to yet another embodiment, the three vertices of the input patch are a top vertex, a left vertex and a right vertex and the vertex tessellation factor for the new vertex at the center of the triangle is calculated using:

$$MID.TF=MEAN(TOP.TF,LEFT.TF,RIGHT.TF)$$

where MID.TF is the vertex tessellation factor of the new vertex, TOP.TF is the vertex tessellation factor of the top vertex, LEFT.TF is the vertex tessellation factor of the left vertex and RIGHT.TF is the vertex tessellation factor of the right vertex and MEAN( ) is a mean of values within the parentheses.

According to yet another embodiment, MEAN(TOP.TF, LEFT.TF, RIGHT.TF) is calculated using:

$$MEAN(TOP.TF,LEFT.TF,RIGHT.TF)=MIN(AVG\\(TOP.TF,LEFT.TF,RIGHT.TF),MIN(TOP.TF,\\LEFT.TF,RIGHT.TF)+INTERVAL)$$

where: AVG( ) is an arithmetic mean of values within the parentheses, MIN( ) is a minimum of a list of values within the parentheses and INTERVAL is a pre-defined parameter.

According to yet another embodiment, the input patch is a quad patch having four vertices and wherein generating one or more initial patches comprises: forming a new vertex at a center of the quad patch; calculating a vertex tessellation factor for the new vertex; dividing the input patch to form four initial patches, each initial patch being a triangle patch with the new vertex as the top vertex; and reducing the vertex tessellation factor of each vertex in each of the newly formed initial patches.

According to yet another embodiment, the input patch is a quad patch having four vertices and a center tessellation factor and wherein generating one or more initial patches comprises: adding five new vertices to sub-divide the input patch into four sub-input quad patches; calculating a vertex tessellation factor for each of the five newly added vertices;

reducing the vertex tessellation factor of each vertex in the newly formed four sub-input patches; and for each sub-input patch: forming a new vertex at a center of the quad patch; calculating a vertex tessellation factor for the new vertex; dividing the input patch to form four initial patches, each initial patch being a triangle patch with the new vertex as the top vertex; and reducing the vertex tessellation factor of each vertex in each of the newly formed initial patches.

According to yet another embodiment, the input patch is a triangle patch having three vertices and a center tessellation factor and wherein generating one or more initial patches comprises: adding four new vertices to sub-divide the input patch into three sub-input quad patches; calculating a vertex tessellation factor for each of the five newly added vertices; reducing the vertex tessellation factor of each vertex in the newly formed four sub-input patches; and for each sub-input patch: forming a new vertex at a center of the quad patch; calculating a vertex tessellation factor for the new vertex; dividing the input patch to form four initial patches, each initial patch being a triangle patch with the new vertex as the top vertex; and reducing the vertex tessellation factor of each vertex in each of the newly formed initial patches.

According to yet another embodiment, the four vertices of the input patch are a top left vertex, a top right vertex, a bottom left vertex and a bottom right vertex and the vertex tessellation factor for the new vertex at the center of the triangle is calculated using:

MID.TF=MEAN(TLEFT.TF,TRIGHT.TF,BLEFT.TF, BRIGHT.TF)

where MID.TF is the vertex tessellation factor of the new vertex, TLEFT.TF is the vertex tessellation factor of the top left vertex, TRIGHT.TF is the vertex tessellation factor of the top right vertex, BLEFT.TF is the vertex tessellation factor of the bottom left vertex, BRIGHT.TF is the vertex tessellation factor of the bottom right vertex and MEAN( ) is a mean of values within the parentheses.

According to yet another embodiment, MEAN (TLEFT.TF, TRIGHT.TF, BLEFT.TF, BRIGHT.TF) is calculated using:

MEAN(TLEFT.TF,TRIGHT.TF,BLEFT.TF, BRIGHT.TF)=MIN(AVG(TLEFT.TF, TRIGHT.TF,BLEFT.TF,BRIGHT.TF),MIN (TLEFT.TF,TRIGHT.TF,BLEFT.TF, BRIGHT.TF)+INTERVAL)

where: AVG( ) is an arithmetic mean of values within the parentheses, MIN( ) is a minimum of a list of values within the parentheses and INTERVAL is a pre-defined parameter.

According to yet another embodiment, reducing the vertex tessellation factor of each vertex in each of the newly formed initial patches comprises reducing each vertex tessellation factor by the pre-defined parameter, INTERVAL.

According to one embodiment, in the hardware tessellation unit, the input patch is a triangle patch having three vertices and wherein the hardware logic configured to generate one or more initial patches comprises hardware logic configured to: compare a vertex tessellation factor of each of the three vertices to a threshold value; in response to determining that none of the vertex tessellation factors exceed the threshold value, output data describing the input patch; and in response to determining that at least one of the vertex tessellation factors exceed the threshold value, form a new vertex at a center of the triangle, calculate a vertex tessellation factor for the new vertex, divide the input patch to form three initial patches, each initial patch being a triangle patch with the new vertex as the top vertex and reduce the vertex tessellation factor of each vertex in each of the newly formed initial patches.

According to another embodiment, the input patch is a quad patch having four vertices and wherein the hardware logic configured to generate one or more initial patches comprises hardware logic configured to: form a new vertex at a center of the quad patch; calculate a vertex tessellation factor for the new vertex; divide the input patch to form four initial patches, each initial patch being a triangle patch with the new vertex as the top vertex; and reduce the vertex tessellation factor of each vertex in each of the newly formed initial patches.

According to yet another embodiment, the input patch is a quad patch having four vertices and a center tessellation factor and wherein the hardware logic configured to generate one or more initial patches comprises hardware logic configured to: add five new vertices to sub-divide the input patch into four sub-input quad patches; calculate a vertex tessellation factor for each of the five newly added vertices; reduce the vertex tessellation factor of each vertex in the newly formed four sub-input patches; and for each sub-input patch: form a new vertex at a center of the quad patch; calculate a vertex tessellation factor for the new vertex; divide the input patch to form four initial patches, each initial patch being a triangle patch with the new vertex as the top vertex; and reduce the vertex tessellation factor of each vertex in each of the newly formed initial patches.

According to yet another embodiment, the input patch is a triangle patch having three vertices and a center tessellation factor and wherein the hardware logic configured to generate one or more initial patches comprises hardware logic configured to: add four new vertices to sub-divide the input patch into three sub-input quad patches; calculate a vertex tessellation factor for each of the five newly added vertices; reduce the vertex tessellation factor of each vertex in the newly formed four sub-input patches; and for each sub-input patch: form a new vertex at a center of the quad patch; calculate a vertex tessellation factor for the new vertex; divide the input patch to form four initial patches, each initial patch being a triangle patch with the new vertex as the top vertex; and reduce the vertex tessellation factor of each vertex in each of the newly formed initial patches.

According to one aspect, there is provided a computer readable storage medium having encoded thereon computer readable program code defining the hardware tessellation unit according to any of the embodiments.

According to a further aspect, there is provided a computer readable storage medium having encoded thereon computer readable program code defining a hardware tessellation unit configured to perform any method according to the embodiments.

Figure 20:
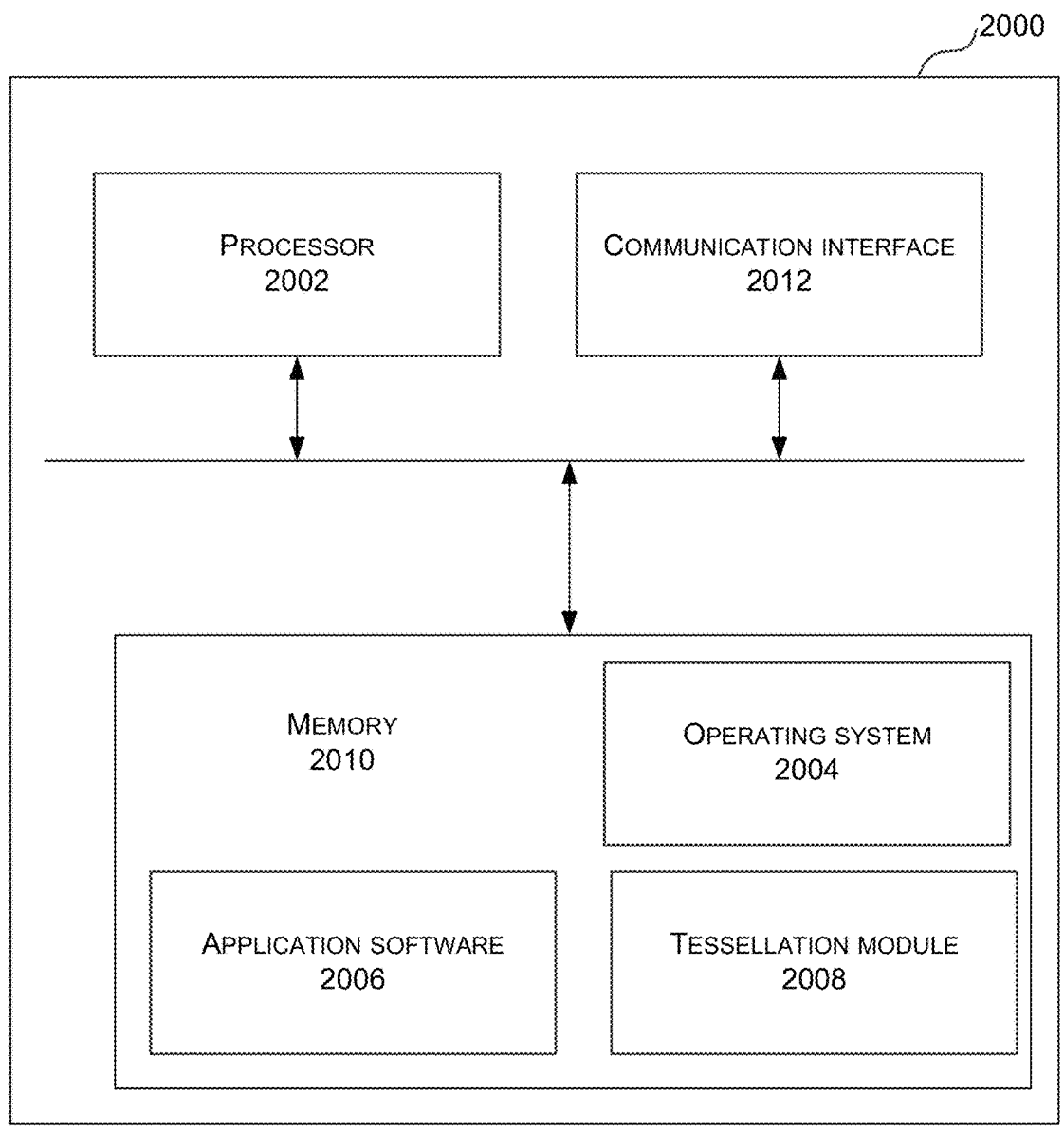
FIG. 20 illustrates various components of an exemplary computing-based device which may be implemented as any form of a computing and/or electronic device, and which may be configured to implement the improved tessellation method described herein.

The improved tessellation method described above may alternatively be implemented in software (or a combination of software and hardware). FIG. 20 illustrates various components of an exemplary computing-based device 2000 which may be implemented as any form of a computing and/or electronic device, and which may be configured to implement the tessellation methods described above.

Computing-based device 2000 comprises one or more processors 2002 which may be microprocessors, controllers or any other suitable type of processors for processing computer executable instructions to control the operation of the device in order to perform the improved tessellation method described above. In some examples, for example where a system on a chip architecture is used, the processors 2002 may include one or more fixed function blocks (also referred to as accelerators) which implement a part of the improved tessellation method in hardware (rather than software or firmware). Platform software comprising an operating system 2004 or any other suitable platform software may be provided at the computing-based device to enable application software 2006 to be executed on the device and the application software may include a tessellation module 2008. This tessellation module 2008 may, for example, comprise a pre-processing module (which implements block 504 of FIG. 5 or 15), optionally an additional pre-processing module (which implements block 1502 of FIG. 15) and a recursive tessellation module (which implements block 506 and/or 508 of FIG. 5 or 15).

The computer executable instructions may be provided using any computer-readable media that is accessible by computing based device 2000. Computer-readable media may include, for example, computer storage media such as memory 2010 and communications media. Computer storage media (i.e. non-transitory machine readable media), such as memory 2010, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 2010) is shown within the computing-based device 2000 it will be appreciated that the storage may be distributed or located remotely and accessed via a network or other communication link (e.g. using communication interface 2012).

The computing-based device 2000 may also comprise an input/output controller arranged to output display information to a display device which may be separate from or integral to the computing-based device 2000. The display information may provide a graphical user interface. The input/output controller may also be arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software in machine readable form which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method of performing tessellation of an input patch in a computer graphics system, wherein the input patch has a plurality of vertices, the method comprising:
    comparing a vertex tessellation factor of each of the vertices of the input patch to a threshold value; and
    in response to determining that at least one of the vertex tessellation factors exceed the threshold value, forming a new vertex at a center of the input patch;
    calculating a vertex tessellation factor for the new vertex;
    dividing the input patch to form a plurality of new patches, wherein each of the new patches is a triangle patch having three vertices including the new vertex and two of the vertices of the input patch; and
    reducing the vertex tessellation factor of each of the vertices of the new patches.

2. The method of claim 1, further comprising using the new patches in rendering a scene in the computer graphics system.

3. The method of claim 1, further comprising:
    in response to determining that none of the vertex tessellation factors exceed the threshold value, outputting data describing the input patch.

4. The method of claim 1 wherein said forming a new vertex, calculating a vertex tessellation factor, dividing the input patch and reducing the vertex tessellation factor are performed in response to determining that at least one of the vertex tessellation factors exceed the threshold value.

5. The method of claim 1, wherein the input patch is a triangle patch having three vertices.

6. The method of claim 5, wherein the three vertices of the input patch are a top vertex, a left vertex and a right vertex and the vertex tessellation factor for the new vertex at the center of the triangle is calculated using:

$$MID.TF=MEAN(TOP.TF,LEFT.TF,RIGHT.TF)$$

where MID.TF is the vertex tessellation factor of the new vertex, TOP.TF is the vertex tessellation factor of the top vertex, LEFT.TF is the vertex tessellation factor of the left vertex and RIGHT.TF is the vertex tessellation factor of the right vertex and MEAN( ) is a mean of values within the parentheses.

7. The method of claim 6, wherein MEAN(TOP.TF, LEFT.TF, RIGHT.TF) is calculated using:

$$MEAN(TOP.TF,LEFT.TF,RIGHT.TF)=MIN(AVG(TOP.TF,LEFT.TF,RIGHT.TF),MIN(TOP.TF,LEFT.TF,RIGHT.TF)+INTERVAL)$$

where: AVG( ) is an arithmetic mean of values within the parentheses, MIN( ) is a minimum of a list of values within the parentheses and INTERVAL is a pre-defined parameter.

8. The method of claim 7, wherein reducing the vertex tessellation factor of each vertex in each of the newly formed initial patches comprises reducing each vertex tessellation factor by the pre-defined parameter, INTERVAL.

9. The method of claim 7, wherein INTERVAL=0.510.

10. The method of claim 1 wherein the input patch is a quad patch having four vertices.

11. The method of claim 10, wherein the four vertices of the input patch are a top left vertex, a top right vertex, a bottom left vertex and a bottom right vertex and the vertex tessellation factor for the new vertex at the centre of the triangle is calculated using:

$$MID.TF=MEAN(TLEFT.TF,TRIGHT.TF,BLEFT.TF,BRIGHT.TF)$$

where MID.TF is the vertex tessellation factor of the new vertex, TLEFT.TF is the vertex tessellation factor of the top left vertex, TRIGHT.TF is the vertex tessellation factor of the top right vertex, BLEFT.TF is the vertex tessellation factor of the bottom left vertex, BRIGHT.TF is the vertex tessellation factor of the bottom right vertex and MEAN( ) is a mean of values within the parentheses.

12. The method of claim 11, wherein MEAN(TLEFT.TF, TRIGHT.TF, BLEFT.TF, BRIGHT.TF) is calculated using:

MEAN(TLEFT.TF,TRIGHT.TF,BLEFT.TF, BRIGHT.TF)=MIN(AVG(TLEFT.TF, TRIGHT.TF,BLEFT.TF,BRIGHT.TF),MIN (TLEFT.TF,TRIGHT.TF,BLEFT.TF, BRIGHT.TF)+INTERVAL)

where: AVG( ) is an arithmetic mean of values within the parentheses, MIN( ) is a minimum of a list of values within the parentheses and INTERVAL is a pre-defined parameter.

13. The method of claim 12, wherein reducing the vertex tessellation factor of each vertex in each of the newly formed initial patches comprises reducing each vertex tessellation factor by the pre-defined parameter, INTERVAL.

14. The method of claim 10, further comprising:
receiving a preliminary triangle patch having a centre tessellation factor;
adding four new vertices to sub-divide the preliminary triangle patch into three new quad patches;
calculating a vertex tessellation factor for each of the four new vertices; and
reducing the vertex tessellation factor of each of the vertices in the three new quad patches,
wherein the input patch on which tessellation is performed is one of the three new quad patches.

15. The method of claim 10, further comprising:
receiving a preliminary quad patch having a centre tessellation factor;
adding five new vertices to sub-divide the preliminary quad patch into four new quad patches;
calculating a vertex tessellation factor for each of the five new vertices; and
reducing the vertex tessellation factor of each of the vertices in the four new quad patches,
wherein the input patch on which tessellation is performed is one of the four new quad patches.

16. The method of claim 1, wherein the new vertex is formed at a barycenter of the input patch.

17. A hardware tessellation unit configured to perform tessellation of an input patch in a computer graphics system, the hardware tessellation unit comprising hardware logic configured to:
compare a vertex tessellation factor of each of the vertices of the input patch to a threshold value; and
in response to determining that at least one of the vertex tessellation factors exceeds the threshold value, form a new vertex at a center of the input patch;
calculate a vertex tessellation factor for the new vertex;
divide the input patch to form a plurality of new patches, wherein each of the new patches is a triangle patch having three vertices including the new vertex and two of the vertices of the input patch; and
reduce the vertex tessellation factor of each of the vertices of the new patches.

18. The hardware tessellation unit of claim 17, wherein the input patch is a triangle patch having three vertices or a quad patch having four vertices.

19. The hardware tessellation unit of claim 17, wherein the hardware logic is further configured to:
in response to determining that none of the vertex tessellation factors exceed the threshold value, output data describing the input patch.

20. The hardware tessellation unit of claim 17, wherein the hardware logic is configured to form a new vertex, calculate a vertex tessellation factor, divide the input patch and reduce the vertex tessellation factor in response to determining that at least one of the vertex tessellation factors exceed the threshold value.

* * * * *